(12) United States Patent
Holler et al.

(10) Patent No.: US 9,381,465 B2
(45) Date of Patent: Jul. 5, 2016

(54) METHOD FOR THE THERMAL CONDITIONING OF AN AUXILIARY MATERIAL AND CONDITIONING FACILITY

(71) Applicant: Dürr Systems GmbH, Bietigheim-Bissingen (DE)

(72) Inventors: Sebastian Holler, Tamm (DE); Cord Kirschke, Hemmingen (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 135 days.

(21) Appl. No.: 14/265,872

(22) Filed: Apr. 30, 2014

(65) Prior Publication Data

US 2014/0230725 A1    Aug. 21, 2014

Related U.S. Application Data

(63) Continuation of application No. PCT/EP2012/071627, filed on Oct. 31, 2012, which is a continuation-in-part of application No. PCT/EP2012/058167, filed on May 3, 2012.

(30) Foreign Application Priority Data

| Nov. 2, 2011 | (DE) | ..................... 20 2011 107 555 U |
| Oct. 26, 2012 | (DE) | ......................... 10 2012 110 243 |
| Oct. 26, 2012 | (DE) | ......................... 10 2012 219 692 |

(51) Int. Cl.
*B01D 53/44* (2006.01)
*B05B 15/00* (2006.01)
(Continued)

(52) U.S. Cl.
CPC ................ *B01D 53/44* (2013.01); *B01D 53/12* (2013.01); *B01D 53/83* (2013.01); *B05B 15/00* (2013.01);
(Continued)

(58) Field of Classification Search
CPC ........... B01D 46/0002; B01D 46/0095; B01D 46/0057; B01D 53/04; B01D 53/12
USPC ............ 55/318, DIG. 46; 95/90, 273; 118/75, 118/309
See application file for complete search history.

(56) References Cited

U.S. PATENT DOCUMENTS

| 2,394,710 A | 2/1946 | McAfee |
| 2,571,380 A | 10/1951 | Penick |

(Continued)

FOREIGN PATENT DOCUMENTS

| CA | 2 379 219 | 1/2001 |
| CA | 2 697 447 | 3/2009 |

(Continued)

*Primary Examiner* — Duane Smith
*Assistant Examiner* — Minh-Chau Pham
(74) *Attorney, Agent, or Firm* — Womble Carlyle Sandridge & Rice LLP

(57) ABSTRACT

In order to provide a method for the thermal conditioning of an auxiliary material, which, to clean a crude gas stream loaded with an organic pollutant, is configured to be introduced into the crude gas stream and together with the organic pollutant forms a stable system of pollutant and auxiliary material, which can be carried out easily and in a resource-saving manner, it is proposed that the method includes the following steps: feeding the system of pollutant and auxiliary material and a carrier gas stream that has been heated in relation to normal conditions into a thermal conditioning device; chemical conversion of at least a part of the organic pollutant to produce a conditioned auxiliary material; separating the conditioned auxiliary material from the auxiliary material loaded with an organic pollutant by transportation by means of a gas flow; and removing the conditioned auxiliary material from the thermal conditioning device.

17 Claims, 17 Drawing Sheets

(51) Int. Cl.
   *B05B 15/12* (2006.01)
   *B01D 53/12* (2006.01)
   *B01D 53/83* (2006.01)

(52) U.S. Cl.
   CPC ....... *B05B 15/1248* (2013.01); *B01D 2253/108* (2013.01); *B01D 2257/708* (2013.01); *B01D 2258/0258* (2013.01); *Y02P 70/36* (2015.11)

(56) References Cited

U.S. PATENT DOCUMENTS

| | | | |
|---|---|---|---|
| 2,650,155 | A | 8/1953 | Medlin |
| 4,017,422 | A | 4/1977 | Gappa et al. |
| 4,537,120 | A | 8/1985 | Josefsson |
| 5,078,084 | A | 1/1992 | Shutic et al. |
| 5,165,969 | A | 11/1992 | Barlett et al. |
| 5,766,355 | A | 6/1998 | Josefsson et al. |
| 6,162,270 | A | 12/2000 | Nystrom et al. |
| 6,226,568 | B1 | 5/2001 | Tong et al. |
| 7,959,722 | B2 | 6/2011 | Wieland et al. |
| 8,535,420 | B2 * | 9/2013 | Holler ................ B01D 46/0002 118/309 |
| 8,961,642 | B2 * | 2/2015 | Holler ................ B01D 46/0095 55/318 |
| 2008/0229925 | A1 | 9/2008 | Wieland et al. |
| 2010/0197213 | A1 | 8/2010 | Holzheimer et al. |
| 2010/0199912 | A1 | 8/2010 | Holzheimer et al. |
| 2011/0041691 | A1 | 2/2011 | Weschke |
| 2011/0059258 | A1 | 3/2011 | Fritz et al. |
| 2011/0274827 | A1 | 11/2011 | Fritz et al. |
| 2012/0285323 | A1 | 11/2012 | Holler et al. |
| 2013/0032089 | A1 | 2/2013 | Link et al. |
| 2014/0130674 | A1 * | 5/2014 | Holler ................ B01D 46/0057 92/273 |
| 2014/0134339 | A1 * | 5/2014 | Holler ................ B01D 46/0057 427/331 |
| 2014/0230725 | A1 * | 8/2014 | Holler ................ B01D 53/12 118/75 |
| 2015/0283492 | A1 * | 10/2015 | Holler ................ B01D 53/04 95/90 |

FOREIGN PATENT DOCUMENTS

| | | |
|---|---|---|
| CA | 2 842 258 | 1/2013 |
| DE | 38 23 924 | 12/1989 |
| DE | 42 11 465 | 10/1993 |
| DE | 100 02 584 | 8/2001 |
| DE | 20 2005 013 403 | 12/2005 |
| DE | 10 2005 013 708 | 9/2006 |
| DE | 10 2007 041 008 | 3/2009 |
| DE | 10 2008 013 713 | 9/2009 |
| DE | 20 2010 012 437 | 12/2010 |
| DE | 10 2009 048 005 | 4/2011 |
| DE | 10 2009 058 206 | 6/2011 |
| EP | 0 356 658 | 3/1990 |
| EP | 0 756 885 | 2/1997 |
| EP | 1 704 925 | 9/2006 |
| EP | 2 039 436 | 3/2009 |
| GB | 2 024 041 | 1/1980 |
| JP | 05-084420 | 4/1993 |
| JP | 06-047245 | 2/1994 |
| WO | WO 03/092907 | 11/2003 |
| WO | WO 2010/069407 | 6/2010 |
| WO | WO 2011/076600 | 6/2011 |

* cited by examiner

METHOD FOR THE THERMAL CONDITIONING OF AN AUXILIARY MATERIAL AND CONDITIONING FACILITY

CROSS-REFERENCE TO RELATED APPLICATIONS

The present application is a continuation of international application no. PCT/EP2012/071627, filed on Oct. 31, 2012, which is a continuation-in-part of international application no. PCT/EP2012/058167, filed on May 3, 2012, and claims the benefit of German application no. 20 2011 107 555.2, filed on Nov. 2, 2011, German application no. 10 2012 219 692.7, filed on Oct. 26, 2012, and German application no. 10 2012 110 243.0, filed on Oct. 26, 2012, all of which are incorporated herein by reference in their entirety and for all purposes.

FIELD OF DISCLOSURE

The present invention relates to a method for the thermal conditioning of an auxiliary material, which, to clean a crude gas stream loaded with an organic pollutant, is configured to be introduced into the crude gas stream and, together with the organic pollutant, forms a stable system of pollutant and auxiliary material.

BACKGROUND

Auxiliary material loaded with pollutant can, for example, be conditioned by a wet-chemical method.

SUMMARY OF THE INVENTION

The present invention is based on the object of providing a method for the thermal conditioning of an auxiliary material, which is configured to be carried out easily and in a resource-saving manner.

This object is achieved according to the invention by a method for the thermal conditioning of an auxiliary material, in which the auxiliary material, to clean a crude gas stream loaded with an organic pollutant, is configured to be introduced into the crude gas stream, the auxiliary material, together with the pollutant, forming a stable system of pollutant and auxiliary material. According to the invention, the method comprises the following:

feeding the system of pollutant and auxiliary material and a carrier gas stream that has been heated relative to normal conditions into a thermal conditioning device;

chemically converting at least a part of the organic pollutant to produce a conditioned auxiliary material;

separating the conditioned auxiliary material from the auxiliary material loaded with an organic pollutant by transportation by means of a gas flow;

removing the conditioned auxiliary material from the thermal conditioning device.

In one configuration of the invention it is provided that an auxiliary filter material, which is used to clean a crude gas stream loaded with a pollutant in the form of paint overspray, is selected as the auxiliary material, the auxiliary filter material, with the paint overspray, forming a stable system under normal conditions of auxiliary filter material loaded with paint overspray, which is configured to be deposited on a filter device.

It may be favorable if the conditioning device contains or comprises a fluidized bed base material. The fluidized bed base material preferably has a chemical composition that corresponds to the chemical composition of a material used as auxiliary material.

The auxiliary material loaded with pollutant may, in particular, be easily conditioned by joint swirling with a fluidized bed base material.

The term "normal conditions" is, in particular, to be taken to mean a temperature between about 20° C. and about 30° C.

The carrier gas stream may, for example, comprise air or consist of air. Furthermore, it may be provided that the carrier gas stream comprises nitrogen or one or more other inert gases or consists of nitrogen or one or more other inert gases. The carrier gas stream may, in particular, to assist the thermal conditioning, comprise a reactive gas or gas mixture and/or an inert gas or gas mixture or consist thereof.

In particular, any medium that is in a position to absorb a liquid proportion of the pollutant can be used as the auxiliary material.

The auxiliary material is preferably a particulate and/or powdery material.

In particular, possible examples of auxiliary materials are lime, rock flour, in particular limestone flour, aluminum silicates, aluminum oxides, silicon oxides, powder paint or similar.

As an alternative or in addition to this, particles with a cavity structure and a large inner surface relative to their outer dimensions, for example natural and/or synthetic zeolites or other hollow, for example spherical, bodies made of polymers, glass or aluminum silicate and/or natural or synthetically produced fibers, can also be used as the auxiliary material to absorb and/or bind the pollutant.

Aluminosilicates are, in particular, designated zeolites, which have the general total formula $M^{n+}{}_{x/n}[(AlO_2)^{x-}(SiO_2)^y]\cdot zH_2O$ ($M^{n+}$: metal cation; x/n: stoichiometric factor, which is produced from the charge of the cation and that of the aluminate anion (="modulus")). For example, calcium, magnesium, calcium-magnesium, sodium and/or potassium zeolites may be used. Mixtures of two or more of these zeolite types are preferably used.

As an alternative or in addition to this, particles reacting chemically with the pollutant, for example chemically reactive particles with amine, epoxide, carboxyl, hydroxyl or isocyanate groups, chemically reactive particles of aluminum oxide post-treated with octyl silane or solid or liquid monomers, oligomers or polymers, silanes, silanols or siloxanes, can also be used as the auxiliary material to absorb and/or bind the pollutant.

The auxiliary material preferably consists of a plurality of auxiliary material particles, which, in particular, have a mean diameter in the range from about 10 μm to about 100 μm.

The auxiliary material is, in particular, a flowable, particulate material, which, for example in the form of auxiliary filter material, is also called a "precoat" material.

The auxiliary filter material is used, in particular, to be deposited as a barrier layer on the surface of a filter element in order to prevent this surface being clogged by adhering paint overspray particles. Owing to a periodic cleaning of the filter element, a system of pollutant and auxiliary material, in particular paint overspray and auxiliary filter material, arrives from the filter element into a receiving container.

Auxiliary material loaded with pollutant may, in particular, be a mixture or a system of pollutant particles and auxiliary material particles. For example, the mixture may comprise conglomerates and/or agglomerates of particles of pollutant and particles of auxiliary material.

Particles of pollutant are, in particular, paint droplets.

Particles of auxiliary material are, in particular, rock flour grains.

Auxiliary material that is usable to clean the crude gas stream loaded with pollutant preferably has a particle size distribution allowing at least a majority of the particles of the auxiliary material to be able to be entrained and/or absorbed by the crude gas stream.

It may be provided that a fluidized bed base material chemically substantially corresponds to the auxiliary material, in particular the auxiliary material to be conditioned.

A material chemically substantially corresponding to the auxiliary material is, in particular, to be taken to mean a material substantially having the same chemical composition as the auxiliary material. In particular, a material chemically substantially corresponding to the auxiliary material is formed from the same substance as the auxiliary material.

As an alternative or in addition to this, it may be provided that the fluidized bed base material comprises an auxiliary material that is chemically different from the auxiliary material to be conditioned. In this case, it may be advantageous if the fluidized bed base material has a chemical composition which, optionally after carrying out a comminution process of the fluidized bed base material, allows the use of the fluidized bed base material as auxiliary material.

In particular, it may be provided that the fluidized bed base material is compatible with the auxiliary material to be conditioned, so a mixture of conditioned auxiliary material and, optionally comminuted, fluidized bed base material is usable to clean a crude gas stream loaded with pollutant.

Any particulate material can preferably be used as the fluidized bed base material. This may, in particular, be an inorganic and/or flowable material. It may be present as a pure substance, for example as limestone flour or as a mixture of various substances, for example as a mixture of limestone flour and zeolite.

By swirling the auxiliary material loaded with pollutant and/or a fluidized bed base material, a fluidized bed is preferably produced, in particular a bubble-forming and/or a circulating fluidized bed.

The conditioning device is, in particular, configured as a fluidized bed furnace.

A filter device is preferably a regenerable filter device.

A regenerable filter device is to be taken to mean a separating device for separating contaminants from a gas stream guided through a painting device, in particular for separating pollutant, in particular paint overspray, from a crude gas stream containing a pollutant, in which deposited contaminants can be cleaned off, without having to exchange filter elements of the filter device.

A regenerable filter device is, in particular, also to be taken to mean a filter device having one or more dry filter elements and/or dry separation devices, in which a cleaning of a gas stream takes place substantially without adding a liquid to the filter elements. Independently of this, downstream or upstream cleaning stages can in turn be provided using (under normal conditions) liquid solvents or cleaning agents.

It may further be provided in a regenerable filter device that the filter device comprises at least one filter element, which is provided during filter operation with a barrier layer and/or protective layer, which comprises auxiliary filter material, in particular limestone flour.

It can thus be prevented during filter operation of the filter device that the filter element becomes clogged with contaminants from the gas stream fed to the filter device. By cleaning off the barrier layer or protective layer from the filter element of the filter device, a particularly simple regeneration of the filter element can take place said filter element then being reusable by means of the application of a fresh barrier layer or a fresh protective layer.

Powder paint or fluid paint is, in particular possible as the paint.

The term "fluid paint" is here—in contrast to the term "powder paint"—a paint with a flowable consistency, from liquid to pasty (for example in the case of a PVC plastisol). The term "fluid paint" comprises, in particular, the terms "liquid paint" and "wet paint".

When using fluid paint, the paint overspray from the painting device is therefore a fluid paint overspray and when using wet paint it is a wet paint overspray.

It may be advantageous if the median of the particle size distribution of the fluidized bed base material is greater than the median of the particle size distribution of the auxiliary material usable to clean the crude gas stream and/or than the median of the particle size distribution of the auxiliary material loaded with pollutant, in particular the system of pollutant and auxiliary material.

The median of the particle size distribution is that particle size which is not reached by 50% of the particles present, while the further 50% of the particles present are greater than this particle size.

In particular, it may be provided that the median of the particle size distribution of the fluidized bed base material is at least about twice, in particular three times, for example ten times, the median of the particle size distribution of the auxiliary material usable to clean the crude gas stream and/or of the median of the particle size distribution of the auxiliary material loaded with pollutant.

Furthermore, it may be provided that the median of the particle size distribution of the fluidized bed base material is at most about one hundred times, in particular at most about fifty times, in particular at most about thirty times, the median of the particle size distribution of the auxiliary material usable to clean the crude gas stream and/or the median of the particle size distribution of the auxiliary material loaded with pollutant.

In one configuration of the invention it is provided that the auxiliary material loaded with pollutant is heated in the conditioning device, so agglomerates of pollutant and auxiliary material are broken up.

It may be advantageous if the auxiliary material loaded with pollutant is heated in the conditioning device so the pollutant is at least partially converted while particles of the auxiliary material remain unchanged.

In particular, it may be provided here that particles of the auxiliary material remain chemically unchanged.

A particle is to be taken to mean here both a solid body particle, in particular in the case of auxiliary filter material, and also a drop, in particular in the case of the paint overspray.

In particular in the case of agglomerates of pollutant and particles of the auxiliary material, a drying and/or chemical conversion of the pollutant preferably takes place. The pollutant, in particular the particles of the paint overspray, can thus either be completely converted, for example combusted, or it loses at least an adhesive property optionally present beforehand, so the agglomerates of pollutant and auxiliary material disintegrate into particles of the auxiliary material, optionally with residues of pollutant.

In particular when using limestone flour as auxiliary material, it may be provided that the auxiliary material loaded with pollutant is heated in the conditioning device at most to about 550° C., for example at most to about 500° C., in order to prevent an undesired chemical conversion of the limestone flour, in particular the calcium carbonate.

The conditioning device is preferably operated in such a way that a bubble-forming and/or a circulating fluidized bed is formed.

For example, it may be provided that a receiver for the fluidized bed has a cross section upwardly widening counter to the direction of gravity, so a so-called "freeboard" can be formed.

It may be favorable if the conditioning device is operated in such a way that a gradient is formed in the particle size distribution of the auxiliary material, in particular a mixture of auxiliary material loaded with pollutant and/or fluidized bed base material, the median of the particle size distribution of the auxiliary material, in particular of the mixture, increasing downwardly in the direction of gravity.

Small particles of the auxiliary material, in particular those without contamination by pollutant, as well as, preferably, abraded material of the fluidized bed base material preferably collect in an upper region of the auxiliary material, with respect to the direction of gravity, in particular of the mixture of auxiliary material loaded with pollutant and fluidized bed base material.

In one configuration of the invention it is provided that the auxiliary material loaded with pollutant is fed in a lower region, with respect to the direction of gravity, of a fluidized bed produced in the thermal conditioning device by a swirling, to the fluidized bed. In this manner, a particularly long residence time of the auxiliary material loaded with pollutant can be made possible in the mixture of auxiliary material loaded with pollutant and/or fluidized bed base material.

Particles of the system of pollutant and auxiliary material, particles of the conditioned auxiliary material and/or particles of a fluidized bed base material, which preferably collect in an upper region, with respect to the direction of gravity, of a fluidized bed produced by the swirling or are brought out from the fluidized bed, are preferably removed from the conditioning device.

In particular, it may be provided here that the particles are removed from the conditioning device by means of an overflow of the conditioning device.

The removed particles are preferably usable as auxiliary material to clean the crude gas stream.

It may be advantageous if the carrier gas stream is guided from bottom to top through the auxiliary material counter to the direction of gravity to swirl the auxiliary material.

It may be provided that the carrier gas stream is guided from bottom to top through the auxiliary material counter to the direction of gravity to swirl the auxiliary material, the carrier gas stream being fed to a separation device and/or a combustion device before and/or after flowing through the auxiliary material. In this manner, an undesired escape of possible harmful substances from the conditioning device can be avoided.

A separation device may, in particular, be a filter device, for example a hot gas filter, or a cyclone.

The carrier gas stream preferably guided through the auxiliary material to swirl the auxiliary material may, in particular, be heated by means of a heating device. The auxiliary material can thereby be heated when being flowed through.

It may be advantageous if the combustion device comprises a thermal post-incineration device. In this manner, after flowing through the auxiliary material, higher temperatures can be achieved than while flowing through the auxiliary material, in order, in particular, to be able to as far as possible completely combust organic vapors and other gaseous substances that are possible harmful to health.

It may be advantageous if particles of the auxiliary material and/or particles of a fluidized bed base material are removed by means of the carrier gas stream from a fluidized bed produced by a swirling and are deposited on the separation device for removal from the conditioning device.

The separation device may, for this purpose, in particular be arranged spatially separated, for example laterally offset, from a receiver for the fluidized bed. Thus, material deposited on the separation device arriving back in the receiver of the conditioning device, in which the fluidized bed is formed, is, in particular, effectively reduced or completely avoided.

The particles of the auxiliary material loaded with pollutant and/or the particles of a fluidized bed base material, which are preferably removed from the conditioning device are, in particular, reusable to clean the crude gas stream. This auxiliary material is therefore a conditioned auxiliary material.

Furthermore, it may be provided that the carrier gas stream is guided from bottom to top through the auxiliary material counter to the direction of gravity to swirl the auxiliary material, the carrier gas stream being fed to a heat exchanger and/or a drying device to dry workpieces before and/or after flowing through the auxiliary material. The heat present in the carrier gas stream can thus efficiently continue to be used.

The carrier gas stream is used, in particular, to produce and/or maintain a fluidized bed.

It may be provided that the removed carrier gas stream is fed, in particular, to a drying device for drying vehicle bodies. Alternatively or in addition to this, it may be provided that the heat contained in the carrier gas stream is transferred by means of a heat exchanger to other gas streams or other fluid streams. For example, it may be provided that the heat contained in the removed carrier gas stream is transferred by means of a heat exchanger to incoming air for a drying device for drying workpieces, in particular vehicle bodies.

The carrier gas stream can furthermore originate from a drying device for drying workpieces and/or be heated, before it is fed to the conditioning device, by means of a heat exchanger and a fluid stream from the drying device.

In one configuration of the invention a control device for controlling and/or regulating the devices and facilities as well as the components of the devices and facilities is provided. In particular, a conditioning facility can be controlled and/or regulated by means of at least one control device according to the method of the invention.

The present invention furthermore relates to a conditioning facility for the thermal conditioning of an auxiliary material, which, to clean a crude gas stream loaded with an organic pollutant, is configured to be introduced into the crude gas stream and, together with the organic pollutant, forms a stable system of pollutant and auxiliary material.

The invention is based in this regard on the object of providing a conditioning facility, by means of which auxiliary material is configured to be conditioned easily and in a resource-saving manner.

This object is achieved in a conditioning facility for the thermal conditioning of an auxiliary material in that the conditioning facility comprises the following:
  a thermal conditioning device for the chemical conversion of at least a part of the organic pollutant to produce a conditioned auxiliary material;
  a feed device for feeding the system of pollutant and auxiliary material and a carrier gas stream that is heated relative to normal conditions to the thermal conditioning device;

a separating device for separating the conditioned auxiliary material from the auxiliary material loaded with an organic pollutant by transportation by means of a gas flow;

a removal device for removing the conditioned auxiliary material from the conditioning device.

The conditioning facility according to the invention preferably has individual or a plurality of features and/or advantages described in conjunction with the method according to the invention for the thermal conditioning of an auxiliary material.

In particular, it may be provided that auxiliary material loaded with pollutant is configured to be fed by means of the feed device in a lower region, with respect to the direction of gravity, of a fluidized bed produced by a swirling in the thermal conditioning device, to the fluidized bed. In particular, the auxiliary material loaded with pollutant is configured to be fed for this to a lower region, with respect to the direction of gravity, of a receiver of the conditioning device to receive the auxiliary material and/or a fluidized bed base material.

The conditioning device is, in particular, configured as a fluidized bed furnace.

In particular, it may be provided that the conditioning device comprises a receiver, which comprises a gas-permeable base. In this manner, the material received in the receiver, in particular a fluidized bed base material and/or auxiliary material loaded with pollutant, can have gas, in particular carrier gas, flow onto it and through it and therefore be swirled.

Furthermore, it may be provided that the conditioning facility comprises a heating device, by means of which the receiver, the gas-permeable base and/or the fed gas, in other words the carrier gas stream, is heatable.

It may be favorable if particles of the auxiliary material, in particular the auxiliary material loaded with pollutant, and/or particles of a fluidized bed base material in an upper region, with respect to the direction of gravity, of a fluidized bed produced by a swirling are removable by means of the removal device. In particular, an overflow can be provided for this.

It may be favorable if the conditioning facility comprises a separation device and/or a combustion device, to which the carrier gas stream is feedable, which carrier gas stream is configured to be guided through the fluidized bed base material and/or the auxiliary material loaded with pollutant in particular to swirl a fluidized bed base material and/or the auxiliary material loaded with pollutant.

The conditioning facility according to the invention is suitable, in particular, for use in a painting facility.

The present invention furthermore relates to a painting facility for painting workpieces.

The invention is based in this regard on the object of providing a painting facility, which can be operated particularly easily or in a resource-saving manner.

This object is achieved according to the invention in that the painting facility for painting workpieces, in particular vehicle bodies, comprises the following:

a painting device, by means of which the workpieces are configured to be painted with paint;

a filter device for cleaning a crude gas stream produced in the painting device and loaded with paint overspray by feeding auxiliary filter material to the crude gas stream and depositing the paint overspray together with the auxiliary filter material on a filter element of the filter device; and a conditioning facility according to the invention, wherein the organic pollutant is paint overspray and wherein the auxiliary material is auxiliary filter material.

By using a conditioning facility according to the invention, the painting facility according to the invention is configured to be operated in a particularly easy and resource-saving manner.

The painting facility furthermore preferably comprises a mixing device, by means of which fresh auxiliary material and conditioned auxiliary material are configured to be combined and mixed. The mixed auxiliary material is preferably feedable to the filter device of the painting facility.

Furthermore, it may be provided that the painting facility comprises at least one measuring device for measuring and/or determining a proportion of pollutant in the auxiliary material loaded with pollutant, in other words a degree of loading of the auxiliary material with pollutant.

Furthermore, the method according to the invention, the conditioning facility according to the invention and/or the painting facility according to the invention may have individual or a plurality of the features and/or advantages described below:

An abrasion of particles of a fluidized bed based material is preferably used to thin the auxiliary material to be conditioned, in particular residues optionally remaining in the auxiliary material, in particular aluminum flakes of metallic paints.

In particular when using limestone flour as the auxiliary material, it may be provided that the temperature of the fluidized bed based material and/or of the auxiliary material in the conditioning device is selected such that the limestone flour does not burn nor does a calcination take place. In particular, it may be provided that the method is operated at a temperature plateau between combustion and calcination of the limestone flour.

It may also be provided that the conditioning device is operated at very high temperatures, at which the fluidized bed based material and/or the auxiliary material is chemically converted. The materials being produced can then, in particular, be used elsewhere.

It may be provided that zeolites are used as the auxiliary material and/or fluidized bed based material. Zeolites preferably only change slightly chemically at high temperatures.

The use of inorganic materials, for example quartz ($SiO_2$) as the fluidized bed base material and/or as the auxiliary material allows the use of very high temperatures, for example of up to 1,000° C. Consequently, in particular organic materials can be combusted out of the auxiliary material. A thermal post-incineration is preferably then dispensable. In a modified example, sands, optionally as mixtures, also quartz sand, are used as the fluidized bed base material and/or as the auxiliary material.

It may be provided that substances, which are contained, in particular, in the gas stream, in particular carrier gas stream, guided through the fluidized bed base material and/or the auxiliary material loaded with pollutant, are combusted by means of a thermal post-incineration (TPI).

A thermal post-incineration device may, for example, be a separate thermal post-incineration device associated with the conditioning facility or a thermal post-incineration device already present in the painting facility.

A thermal post-incineration device is preferably arranged after a separation device, in particular after a hot gas filter, of the conditioning facility.

It may be favorable if the thermal post-incineration device is configured as a torch. As a result, in particular incompletely combusted, organic components of the gas stream guided through the fluidized bed base material and/or the auxiliary material loaded with pollutant can be completely combusted to form carbon dioxide.

The use of a separate thermal post-incineration device for the conditioning facility can simplify the integration of the conditioning facility in a painting facility, as the erection site of the conditioning facility is then substantially independent of a thermal post-incineration device of the painting facility.

The combustion is preferably an exothermic process, so the waste heat produced here can be used to heat, in particular preheat, other process air, in particular a gas stream. The necessary heating power of the thermal conditioning device can preferably be reduced by this.

An electric heating device is preferably used as the heating device for heating the gas stream guided through the fluidized bed base material and/or the auxiliary material loaded with pollutant.

As an alternative or in addition to this, the gas stream can be heated by means of waste air from a drying device for drying workpieces, in particular vehicle bodies. In particular, it may be provided here that a part of the waste air of the drying device is branched off, guided through the conditioning device, in particular the fluidized bed base material and/or the auxiliary material loaded with pollutant and is optionally then fed to a thermal post-incineration device. As a result, the total air volume stream fed to the thermal post-incineration device preferably remains at least approximately unchanged, as does the design and size of the thermal post-incineration device as a result.

It may be favorable if the waste air from a drying device is loaded with solvents. During the introduction of the waste air as a gas stream into the fluidized bed base material and/or the auxiliary material loaded with pollutant, the solvent already contained in the gas stream can be used, as a result, to heat the gas stream, so less additional energy is required for heating.

It may be favorable if a plurality of process air streams (gas streams) is introduced into the conditioning device, in particular by means of a regulating valve. In particular when using process air streams at a different heat, the temperature of the gas stream fed to the conditioning device can be adjusted in a targeted manner by using a regulating valve.

In particular, it may be provided that a part air stream of the gas stream is overheated, for example has a temperature of 700° C., in order to compensate endothermic processes.

Furthermore, it may be provided that a part air stream consists of a different gas, for example nitrogen, oxygen, carbon dioxide, or comprises a different gas at an increased concentration in order to influence the combustion and/or conversion of the pollutant in a targeted manner by reactions of this gas in the conditioning device.

It may be provided that two process air streams are to be introduced into the conditioning device in such a way that each process air stream can be introduced by way of the burner, in other words at the process temperature or without a burner, in other words at room temperature, into the conditioning device. If one of the process air streams is waste air of a drying device, there can be a very flexible reaction as a result to possible state changes (operating state changes) of the painting facility. For example, a rapid heating of the conditioning device, in particular the fluidized bed base material and/or the auxiliary material loaded with pollutant, can take place by means of waste air of a drying device if the waste air already has a predetermined temperature level. Furthermore, the conditioning device can be reliably operated thereby even without the operation of a drying device. Solvents from the waste air can be combusted in a combustion chamber of the conditioning device, in particular in the region of the fluidized bed base material and/or the auxiliary material loaded with pollutant. Different paint concentrations (degrees of loading) in the auxiliary material loaded with pollutant can preferably be compensated thereby. Furthermore, the conditioning device can be cooled by means of air, the temperature of which is room temperature.

It may be provided that a part air stream, which is introduced into the conditioning device, in particular through the fluidized bed base material and/or the auxiliary material loaded with pollutant, is the waste air of the conditioning device, which, in particular, has a temperature of above about 400° C. This part air stream may comprise the entire waste air of the conditioning device or any desired part thereof.

It may also be provided that part air streams are introduced into the conditioning device at different points of the conditioning device from one another, in particular fed to the fluidized bed base material and/or the auxiliary material loaded with pollutant. For example, it may be provided that a part air stream is added directly over a base of a receiver for the fluidized bed base material and/or the auxiliary material loaded with pollutant, in particular over a fluidized bed, in particular to improve the formation of a fluidized bed.

It may be provided that swirls are produced, in particular by means of special nozzle geometries, by means of an addition of process air in the so-called freeboard, which swirls encourage the removal of particles from the fluidized bed or make it more difficult, in other words, the residence time of the particles in the conditioning device can be reduced or extended.

It may be favorable to introduce process air at various points into the conditioning device. As a result, a "stoichiometric layering" in the conditioning device can be produced, in particular, in other words, different oxygen concentrations prevail at different points in the conditioning device. Thus, for example, oxygen stoichiometrically present to excess can thus, for example, encourage the combustion of pollutant, in particular in order to encourage the combustion reactions proceeding incompletely at the preferred material temperatures of at most about 550° C. In particular, individual combustion processes taking place with particles present in suspension can be encouraged here.

Process air for the thermal conditioning device, in other words, in particular the air (carrier gas stream) guided through the fluidized bed base material and the auxiliary material loaded with pollutant can, for example, be preheated by means of an air heat exchanger. Possible heat-emitting process air streams are, in particular, waste air streams from a thermal post-incineration device.

As the combustion of organic materials to form carbon dioxide is an exothermic process, a cooling optionally has to take place after the run-up phase (starting-up process) of the conditioning facility. Workshop air, for example, can be provided as the cooling air. The heat exchanger of a thermal post-incineration device may, for example, be circumvented by means of a bypass for this purpose.

When the exothermic reaction in the conditioning device becomes too great, a further cooling may become necessary in the conditioning device. In particular, the air quantity used to swirl the auxiliary material loaded with pollutant and/or the fluidized bed base material can be increased for this purpose. Care should preferably be taken that the auxiliary material loaded with pollutant does not leave the fluidized bed.

As an alternative or in addition to this, the feeding of auxiliary material loaded with pollutant to the thermal conditioning device, in particular to the fluidized bed base material, can be reduced or completely stopped. If, alternatively or in addition, the air quantity fed to the conditioning device is reduced to such an extent that there is stoichiometrically a shortage of oxygen, a pyrolysis can take place so that tars, carbon black and/or ashes can be produced.

The conditioning device preferably comprises a control or regulating device, by means of which the temperature of the gas stream fed to the conditioning device, the mass stream of the gas stream fed to the conditioning device as well as the quantity of the fed auxiliary material loaded with pollutant are configured to be controlled and/or regulated.

A regulation may, for example, take place depending on an oxygen content determined, for example, by means of a measuring device, in the conditioning device. Thus, the feeding of auxiliary material loaded with pollutant can be restricted or completely stopped by means of the control device if the oxygen concentration in the conditioning device is too low, for example equal to or less than about 5%. The feed device, for example a screw conveyor, can be controlled for this purpose, for example, by means of a frequency converter, which is restricted, depending on a signal of an oxygen sensor of the measuring device, in particular until the conveying is completely stopped. This can ensure that pollutants of the auxiliary material loaded with pollutant can be substantially completely burnt off before further auxiliary material loaded with pollutant is fed.

In one configuration of the invention it may be provided that, for example, a flow guide (air guide), for example a tube, is arranged centrally in the middle in a receiving device to receive the fluidized bed base material and/or the auxiliary material loaded with pollutant, in which a fluidized bed can preferably be produced by a swirling. The gas stream preferably flows therein from top to bottom in the direction of gravity and is already preheated by the prevailing temperatures. Thus, the pipelines preferably run at least partially, preferably largely, or else completely, within the conditioning device.

It may be advantageous if the conditioning device comprises a receiver, the base of which is configured as a nozzle base. In particular, it may be provided that a nozzle base is configured as a bell base. When using nozzle bases, in particular, a small pressure loss is produced during the introduction of the gas stream for swirling the auxiliary material loaded with pollutant and/or the fluidized bed base material.

As an alternative to this, it may be provided that a base of the receiver of the conditioning device comprises a fluidizing mechanism, for example a fluidizing mechanism formed from sintered ceramic or sintered metal. As a result, the gas stream can be introduced particularly uniformly over the entire area of the base. It is thus structurally particularly easily possible to swirl the auxiliary material loaded with pollutant effectively, in particular with the fluidized bed base material.

Further substances with an organic proportion can preferably be combusted in the conditioning device. For example a booth film-coating, which is contaminated with paint after removal from a painting device, which is configured as a painting booth, of the painting facility, can be comminuted, in particular shredded and fed as an additional solid material stream to the fluidized bed base material and/or the auxiliary material loaded with pollutant. As a result, the heating value of the material to be conditioned can be increased.

The conditioning facility is preferably configured in such a way that even when a plurality of substance streams, material streams and/or gas streams are provided, a thermal conditioning of auxiliary material loaded with pollutant is always also possible only using a gas stream and the auxiliary material to be conditioned that is loaded with pollutant.

In one configuration of the invention, it may be provided that the conditioning device comprises a hot gas filter, through which the gas stream is guided. The conditioning device is supplied, preferably continuously, by means of the feed device, for example a screw conveyor, with auxiliary material loaded with pollutant, which is fed for this purpose, for example just above a base of a receiver of the conditioning device. Owing to the material introduction into the conditioning device, the filling level in the conditioning device increases. Particles of auxiliary material and/or abraded material of fluidized bed base material, which accumulate in the upper end, with respect to the direction of gravity, of the fluidized bed produced, for example, by the swirling, may, for example, be removed by means of an overflow from the conditioning device. The conditioned auxiliary material thus removed is then preferably cooled.

In a further configuration, it may be provided that the conditioning device has a receiver (tube), in which the thermal conditioning takes place and therefore the auxiliary material and/or the fluidized bed base material, are strongly heated. In a further receiver (tube) of the conditioning device, into which conditioned auxiliary material is guided from the first receiver, for example by means of an overflow, the conditioned auxiliary material is fluidized to cool it using a cold gas stream. The cold gas stream thus absorbs the heat of the conditioned auxiliary material, so the second receiver can be cooled as a whole to a temperature of, for example, about 350° C. The heated air can then be removed by means of a filter device, which adjoins the second receiver or is arranged in the second receiver. The temperature of the air here is preferably above the condensation temperature of the organic substances contained therein. A condensation of organic substances, in particular on the filter device, can then be effectively reduced or completely avoided.

It may be favorable if a bubble-forming fluidized bed is formed by the swirling of the auxiliary material loaded with pollutant and/or the fluidized bed base material in the thermal conditioning device. As a result, the solid substance removal from the fluidized bed is minimized. An optimal ratio of air oxygen to pollutant to be combusted is preferably thus selected.

As an alternative to this, it may be provided that a circulating fluidized bed is formed by the swirling of the auxiliary material loaded with pollutant and/or of the fluidized bed base material. It may be favorable if the conditioning device comprises a receiver with a cross section increasing upwardly counter to the direction of gravity (widened "freeboard"). As a result, small particles removed from the fluidized bed can be decelerated because of the reduction in the gas flow speed, so they can fall back into the fluidized bed.

In a further configuration of the invention it may be provided that conditioned auxiliary material is expelled by means of a filter device from the conditioning device. In particular the formation of a circulating fluidized bed may be provided for this purpose. The filter device, in particular a hot gas filter, is preferably arranged for this purpose outside the vertical projection of the receiver, in particular the fluidized bed. Thus, particles deposited on the filter device falling back from the filter device into the fluidized bed, optionally during cleaning, can be effectively reduced or completely avoided. Instead, the falling can take place into a container arranged below the filter device. The conditioning device is preferably operated here in such a way that the particles have a long residence time in the conditioning device in order to be able to ensure a complete conversion of the organic components of the pollutant.

It may furthermore be advantageous if the conditioning device comprises two receivers (as described above) as well as a filter device for expelling the conditioned auxiliary material (as described above).

The conditioning device is preferably integrated into a cleaning device for cleaning a crude gas stream loaded with pollutant, in particular a filter device with regenerable filter modules.

Auxiliary material is preferably automatically removed from the filter device for cleaning the crude gas stream and fed to the conditioning device.

There is preferably provided a buffer device, which in particular is automatic or manually driven, in which auxiliary material loaded with pollutant from the filter device for cleaning the crude gas stream can be intermediately stored. The auxiliary material loaded with pollutant is fed from the buffer device to the conditioning device.

The buffer device comprises, in particular, a buffer container, which has a storage volume of, for example, at least about one cubic meter, in particular about 100 cubic meters.

The feeding of auxiliary material loaded with pollutant to the conditioning device preferably takes place by means of a cooling screw conveyor, which is also called a screw heat exchanger. A cooling of the auxiliary material loaded with pollutant and fed to the conditioning device preferably takes place in such a way that the temperature up to the feeding to the conditioning device is at most about 120° C. in order to prevent tars condensing out in the feed device.

As an alternative to this, a dense stream conveyance may take place, a conveying line preferably being cooled to prevent the heat conduction. If a rapid conveyance takes place, a cooling of the auxiliary material can preferably be dispensed with.

Furthermore, as an alternative to this, a percolation device and/or a vibrating channel may be provided as the feed device.

An average particle size of the fluidized bed base material is preferably between about 0.1 mm and about 10 mm, in particular between about 0.3 mm and about 3 mm.

The median of the particle size distribution of the fresh and/or conditioned auxiliary material is preferably between about 10 μm and about 50 μm, in particular between about 15 μm and about 30 μm.

The median of the particle size distribution of the auxiliary material loaded with pollutant is, for example, about 50 μm to about 60 μm.

Further preferred features and/or advantages of the invention are the subject of the following description and the graphic view of embodiments.

BRIEF DESCRIPTION OF THE DRAWINGS

The same or functionally equivalent elements are provided with the same reference numerals in all the figures.

DETAILED DESCRIPTION OF THE DRAWINGS

Figure 1:
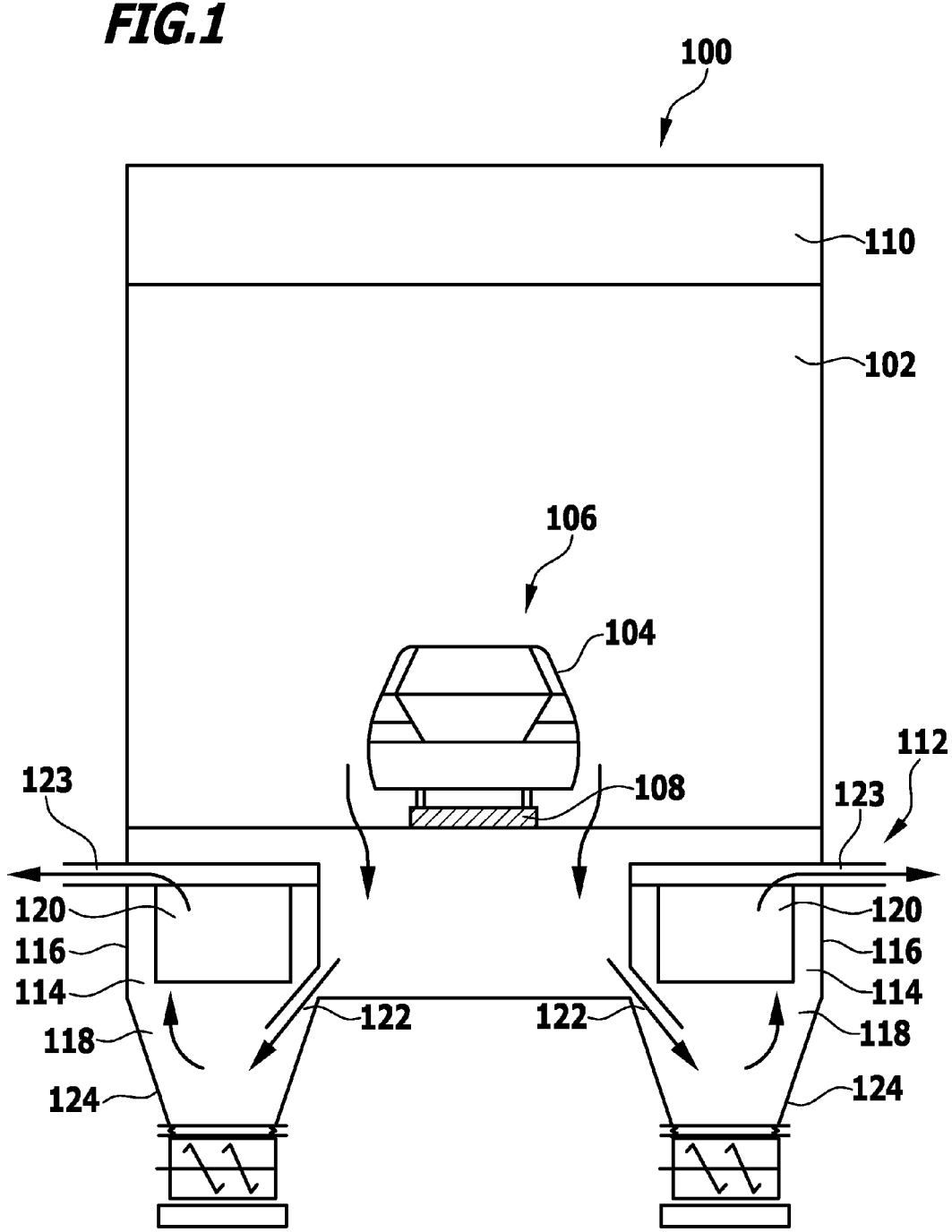
FIG. 1 shows a schematic vertical cross section through a painting facility for painting workpieces.

A painting facility designated 100 as a whole and shown in FIG. 1 comprises a painting device 102 configured as a painting booth, in which paint can be applied to workpieces 104, for example vehicle bodies.

The workpieces 104 are feedable for this purpose to an application region 106 of the painting device 102 by means of a workpiece conveying device 108 and are removable again from the application region 106.

The painting facility 100 furthermore comprises a plenum 110, which is arranged above the painting device 102 and by means of which air is feedable to the application region 106.

The painting facility 100 furthermore comprises a filter facility 112 arranged below the painting device 102, by means of which the air guided through the application region 106, which has absorbed pollutant configured as paint overspray due to the application of paint to the workpieces 104, can be cleaned.

The filter facility 112 comprises a plurality of filter devices 114. Each filter device 114 comprises a housing 116, which delimits a crude gas chamber 118 and in which at least one filter element 120 is arranged.

Furthermore, the filter device 114 comprises an inlet channel 122, through which a crude gas stream, which is formed by the air loaded with pollutant and guided through the application region 106 can flow into the crude gas chamber 118 of the filter device 114.

The filter device 114 is configured as a dry filter device, i.e. the crude gas stream is cleaned substantially without the addition of a liquid on the filter elements 120. Rather, an auxiliary material, in particular an auxiliary filter material, can be fed to the crude gas stream, said auxiliary filter material preferably absorbing a liquid proportion in the pollutant and being able to be deposited together with the pollutant as an auxiliary material loaded with pollutant on the filter element 120. The auxiliary material, together with the pollutant, forms a stable system of pollutant and auxiliary material.

Owing to the cleaning of the crude gas stream, a clean gas stream is obtained, which leaves the filter device 114 through a clean gas line 123.

Owing to a depositing of the pollutant together with the auxiliary material on the filter element 120, a barrier layer or a protective layer is formed that can easily be cleaned from the filter element 120.

The filter device 114 is therefore a regenerable filter device 114, which can be regenerated without an exchange of filter elements 120 and can be reused.

The auxiliary material loaded with pollutant and cleaned from the filter element 120 can be received in a receiving container 124 of the filter device 114, which is arranged below the filter element 120.

After a certain operating period of the filter device 114, the auxiliary material is too heavily loaded with pollutant to be able to still allow a reliable cleaning of the crude gas stream and a safe protection of the filter element 120. The auxiliary material loaded with pollutant consequently has to be regularly conditioned and/or exchanged for fresh auxiliary material.

Figure 2:
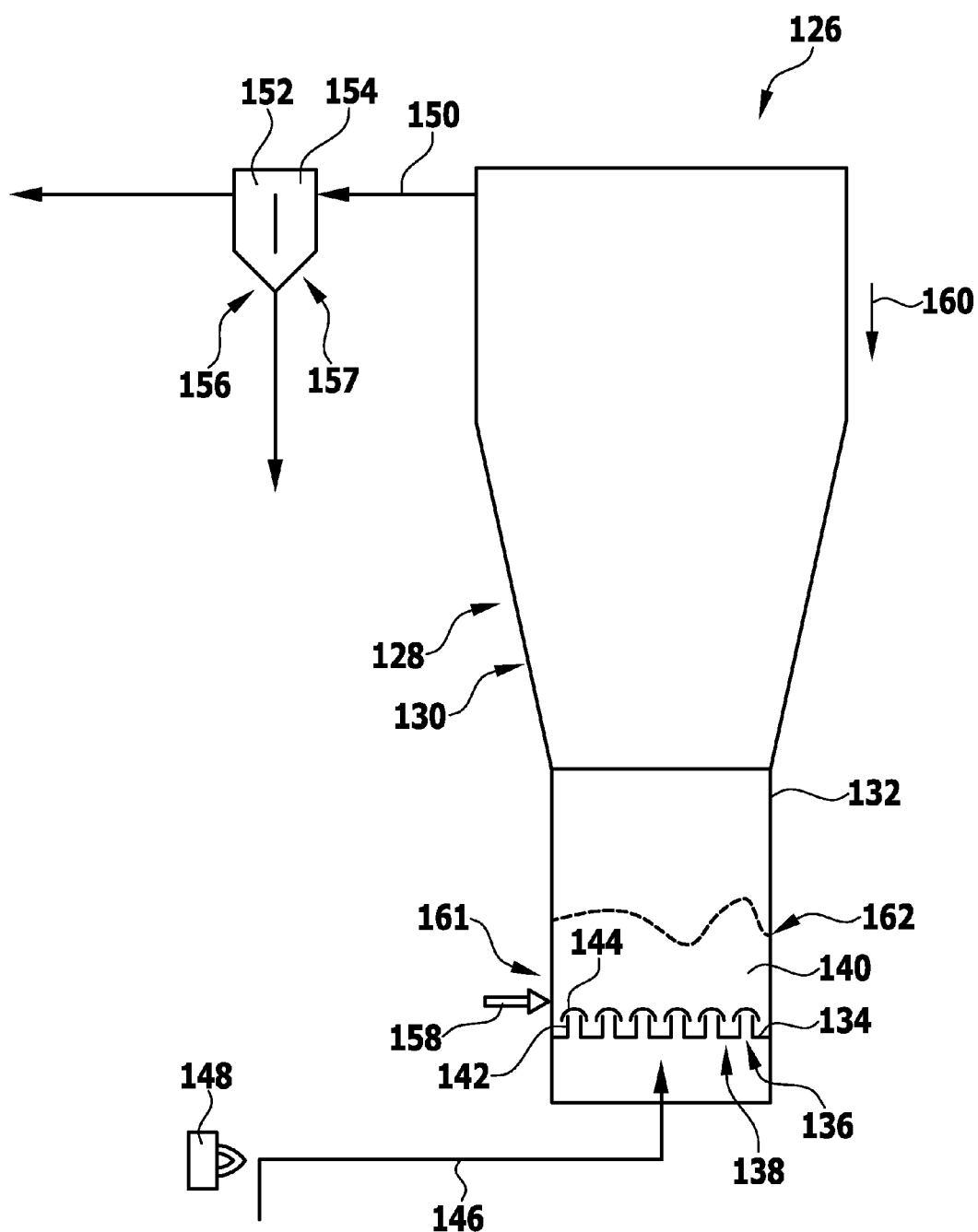
FIG. 2 shows a schematic vertical cross section through a first embodiment of a conditioning facility for conditioning auxiliary material.

To condition the auxiliary material, the painting facility 100 comprises a thermal conditioning facility 126 (see FIG. 2).

It is provided in the first embodiment of the thermal conditioning facility 126 shown in FIG. 2 that the conditioning facility 126 comprises a conditioning device 128, which is configured, in particular, as a fluidized bed furnace 130.

The conditioning device 128 comprises a receiver 132 to receive fluidized bed base material and auxiliary material, in particular auxiliary material loaded with pollutant.

However, the use of fluidized bed base material can also be dispensed with in a further embodiment.

The use of fluidized bed base material may be advantageous if an auxiliary material is to be conditioned, which, for example because of binding forces between the particles of the auxiliary material and/or because of the particle size, cannot be swirled on its own.

A base 134 of the receiver 132 is, for example, configured as a nozzle base 136, in particular as a bell base 138 and allows the feeding of incoming air through the base 134 to the fluidized bed base material and the auxiliary material, in particular the system of pollutant and auxiliary material, in the receiver 132.

By feeding incoming air through the base 134 of the receiver 132, a fluidized bed 140 can be formed from fluidized bed base material and/or from the system of pollutant and auxiliary material in the receiver 132.

The bell base 138 of the receiver 132 comprises a large number of nozzles 142, which are provided, for example in a bell-like manner, with covers 144.

Incoming air can be fed to the receiver 132 of the conditioning device 128 by means of an incoming air line 146 of the conditioning facility 126.

Furthermore, the conditioning facility 126 comprises a heating device 148, in particular a burner, which is used to heat the incoming air.

The incoming air to be heated by means of the heating device 148 and to be fed to the receiver 132 of the conditioning device 128, in the first embodiment shown in FIG. 2 of the conditioning facility 126, is ambient air from the surroundings of the conditioning facility 126, in particular indoor air.

By means of a waste air line 150 of the conditioning facility 126, the gas stream, in particular the carrier gas stream, which is configured to be fed as incoming air to the receiver 132 of the conditioning device 128 by means of the incoming air line 146 and is configured to be guided through the fluidized bed base material and the auxiliary material loaded with pollutant, can be removed from the receiver 132 of the conditioning device 128.

The conditioning facility 126 comprises a separation device 152, for example a filter device 154. This can prevent undesired contaminants of the waste air, i.e. of the gas stream guided through the fluidized bed 140, being discharged to the surroundings of the conditioning facility 126.

Figure 16:
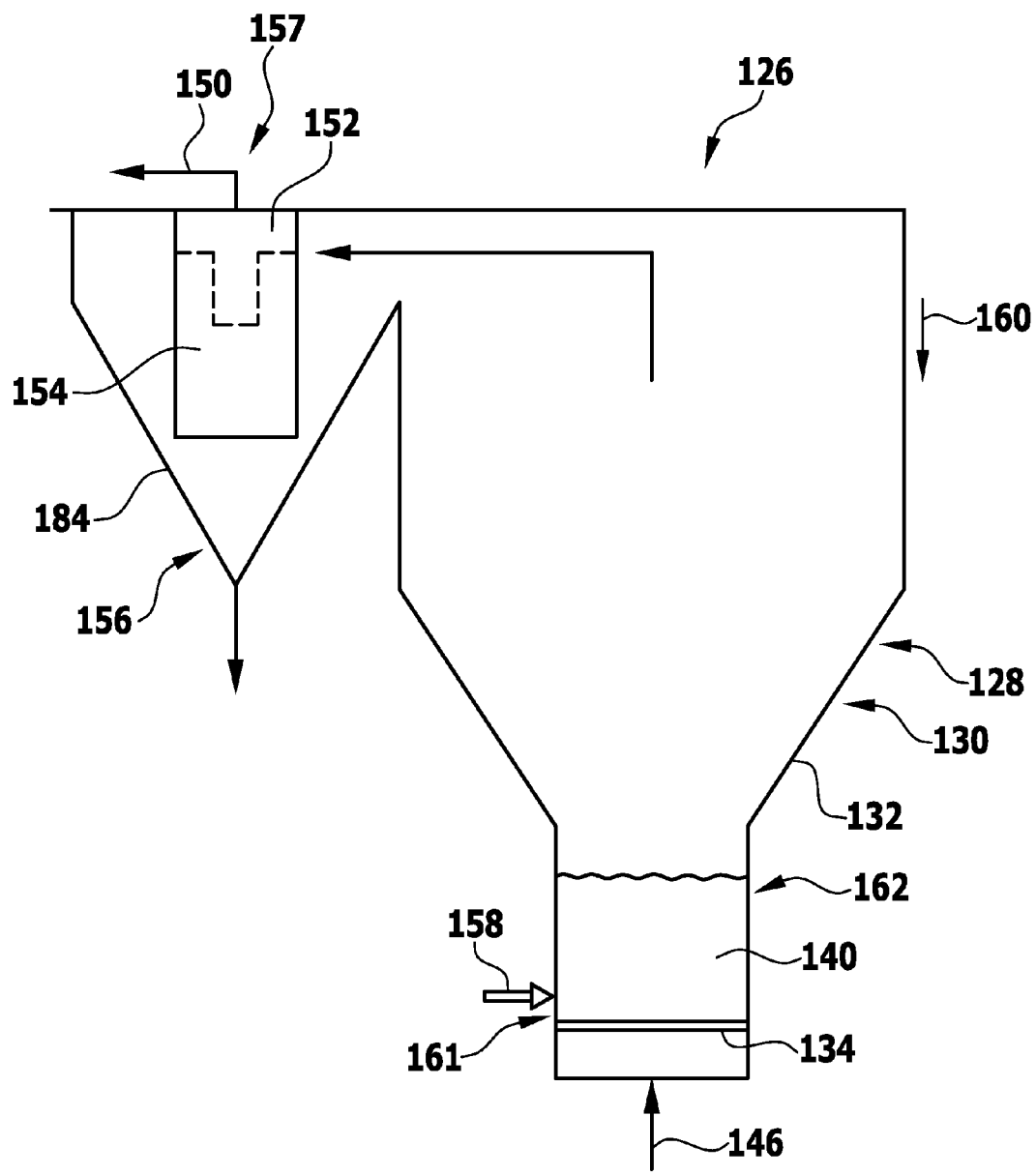
FIG. 16 shows a schematic view corresponding to FIG. 8 of a thirteenth embodiment of a conditioning facility, in which conditioned auxiliary material is expelled by means of a filter device.

Furthermore, conditioned auxiliary material can be expelled from the receiver 132 of the conditioning device 128 by means of the separation device 152, in particular by means of the filter device 154 (see also FIG. 16 in this regard).

The separation device 152 can therefore also be used as a removal device 156 for removing conditioned auxiliary material from the conditioning device 128. In particular, the separation device 152 is a component of a separating system 157 to separate conditioned auxiliary material from the auxiliary material loaded with pollutant.

The conditioning facility 126 furthermore comprises a feed device 158, by means of which auxiliary material loaded with pollutant is configured to be fed to the receiver 132 of the conditioning device 128. In particular, the auxiliary material loaded with pollutant can be fed in a lower region 161, with respect to a direction 160 of gravity, to the receiver 132 thereof.

The first embodiment described above of the conditioning facility 126 functions as follows:

Air is sucked by way of the feed line 146 from the surroundings of the conditioning facility 126 and fed as incoming air to the receiver 132 of the conditioning device 128 The incoming air is heated here by means of the heating device 148 to above the temperature in normal conditions (about 20° C. to 30° C.), in particular to a temperature of about 550° C.

The incoming air is guided as a gas stream, in particular carrier gas stream, through the base 134 of the receiver 132, swirls the fluidized bed base material arranged in the receiver 132 and heats the fluidized bed base material. As a result, a hot fluidized bed 140 is formed in the receiver 132 of the conditioning device 128.

Auxiliary material loaded with pollutant, for example from the filter devices 114, of the filter facility 112 of the painting facility 100 is fed to the fluidized bed base material by means of the feed device 158.

The auxiliary material loaded with pollutant is then heated in the conditioning device 128 and thus conditioned.

The conditioning device 128 is therefore a thermal conditioning device 128.

The conditioning facility 126 is therefore a thermal conditioning facility 126.

By heating the auxiliary material loaded with pollutant, the pollutant is at least partly chemically converted, in particular combusted, or at least the tackiness of the pollutant is reduced, so agglomerates of particles of pollutant and particles of auxiliary material are broken up. Particles of auxiliary material preferably remain chemically unchanged here.

In particular, an organic component of the pollutant is evaporated, preferably combusted by heating the auxiliary material loaded with pollutant, and removed from the system of pollutant and auxiliary material.

The particles of auxiliary material freed of pollutant collect, because of the low mass and/or size, in an upper region 162, with respect to the direction 160 of gravity, of the fluidized bed 140 and can be entrained there by the gas stream flowing through and finally deposited on the separation device 152. These particles are removed as conditioned auxiliary material from the conditioning device 128 by means of the removal device 156 and can be reused in the filter facility 112, in particular in the filter devices 114 of the filter facility 112, for cleaning a crude gas stream.

Limestone flour, in particular, is a possibility as the auxiliary material.

The fluidized bed base material is preferably also limestone flour, but preferably has particles with a larger particle diameter. For example, the particles of the fluidized bed base material are on average at least about 10 times, for example about 50 times, as large as the particles of the auxiliary material.

During operation of the conditioning facility 126, the fluidized bed base material is gradually comminuted by abrasion, so particles of fluidized bed base material are formed which have a similar size to the particles of the auxiliary material. As the fluidized bed base material preferably has a chemical composition corresponding to the chemical composition of a material usable as auxiliary material, the small particles of fluidized bed base material can also be removed by means of the removal device 156 from the conditioning device 128 and used as conditioned auxiliary material in the filter facility 112 to clean a crude gas stream.

Figure 3:
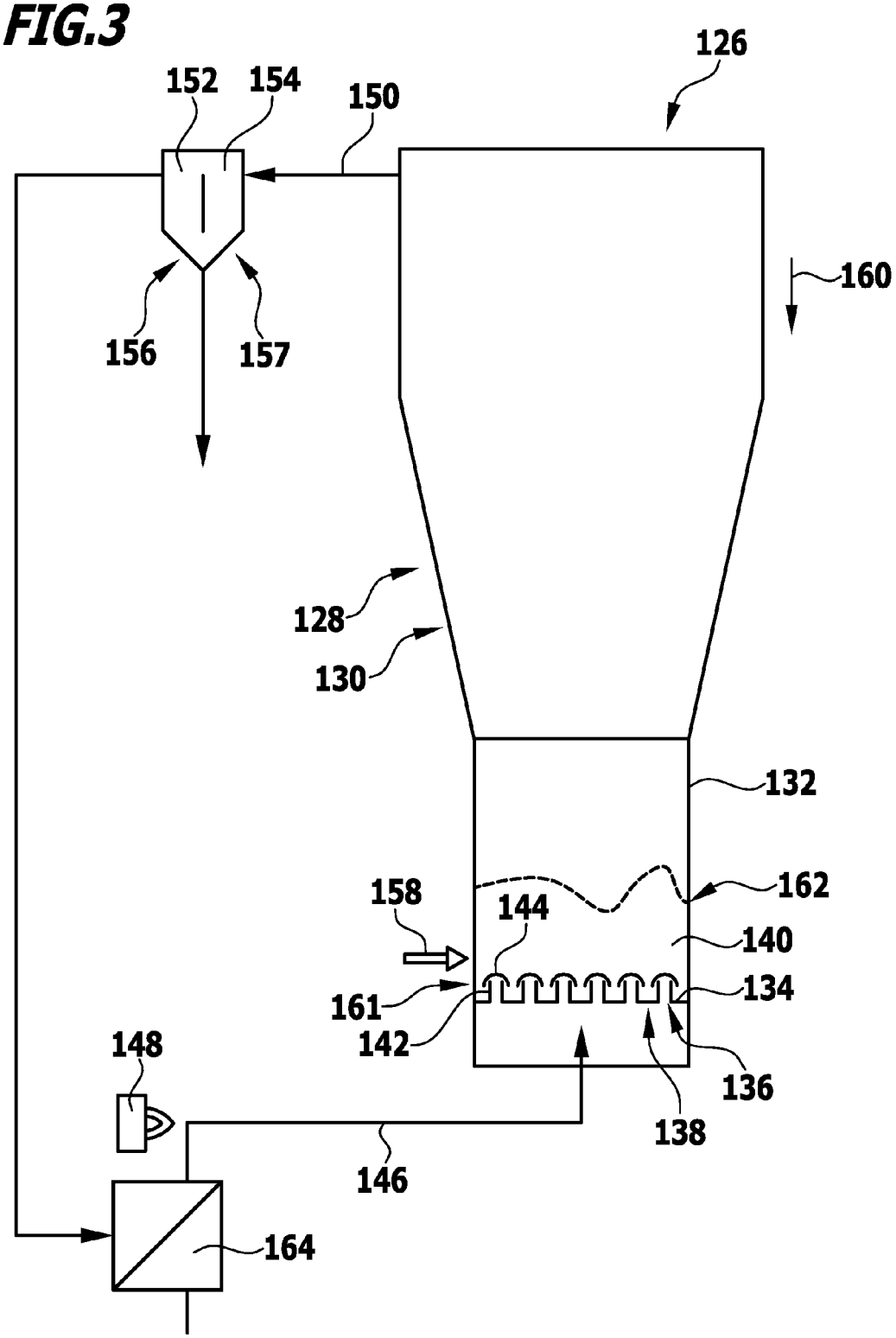
FIG. 3 shows a schematic view corresponding to FIG. 2 of a second embodiment of a conditioning facility, in which waste air from a conditioning device of the conditioning facility is used to heat incoming air for the conditioning device.

A second embodiment of a thermal conditioning facility 126 shown in FIG. 3 differs from the first embodiment shown in FIG. 2 substantially in that the waste air guided through the separation device 152 is not discharged unused to the surroundings. Rather, a heat exchanger 164 is provided, by means of which the heat contained in the waste air from the conditioning device 128 is at least partially transferable to the incoming air to be fed to the conditioning device 128. As a result, a fuel requirement of the heating device 148 can preferably be reduced.

Otherwise, the second embodiment of a conditioning facility 126 shown in FIG. 3 coincides with respect to structure and function to the first embodiment shown in FIG. 2, so to this extent reference is made to the above description thereof.

Figure 4:
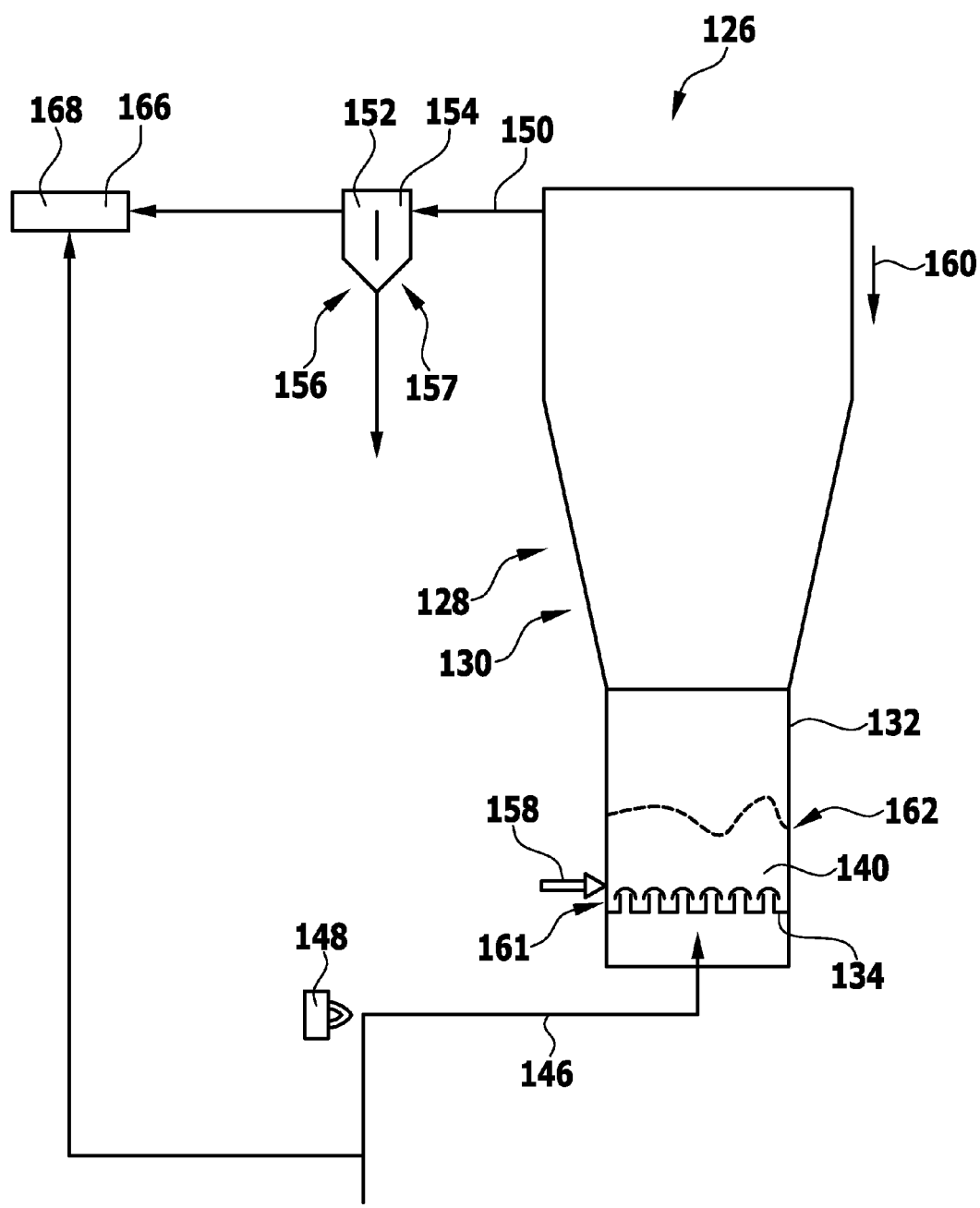
FIG. 4 shows a schematic view corresponding to FIG. 2 of a third embodiment of a conditioning facility, in which a thermal post-incineration device is provided.

A third embodiment of a thermal conditioning facility 126 shown in FIG. 4 differs from the first embodiment shown in FIG. 2 substantially in that waste air from a drying device (still to be described) for drying workpieces 104, in particular vehicle bodies, is used as the incoming air for the conditioning device 128.

Furthermore, in the third embodiment of the conditioning facility 126 shown in FIG. 4, a combustion device 166, in particular a thermal post-incineration device 168, is provided.

The waste air from the drying device is, in this case, partly fed here to the conditioning device 128 and partly directly to the thermal post-incineration device 168.

The waste air from the conditioning device 128 is also fed, in the third embodiment of the conditioning facility 126 shown in FIG. 4 by means of the waste air line 150 after flowing through the separation device 152 to the thermal post-incineration device 168.

By using waste air from the drying device as incoming air for the conditioning device 128, the fuel requirement of the heating device 148 can be reduced. On the one hand, this is because the waste air of the drying device already has an increased temperature. On the other hand, the waste air from the drying device generally contains combustible solvents, which, when combusted in the conditioning device 128, also contribute to the temperature increase while avoiding an additional heating by means of the heating device 148.

The thermal post-incineration device 168 is used to eliminate all the organic and further substances possibly endangering health from the waste air of the drying device and the waste air of the conditioning device 128. In particular, a very high temperature to chemically convert the undesired substances can be used by means of the thermal post-incineration device 168.

Alternatively or in addition to eliminating organic substances from the waste air, in particular from the waste air of the conditioning device, by means of thermal post-incineration a condensate trap can be used. The temperature of the air stream is cooled to below the saturation temperature here of the organic substances to be deposited by means of a heat exchanger. The condensed substances are received in a collecting container.

Otherwise, the third embodiment of the conditioning facility 126 shown in FIG. 4 coincides with the first embodiment shown in FIG. 2, so to this extent reference is made to the above description thereof.

Figure 5:
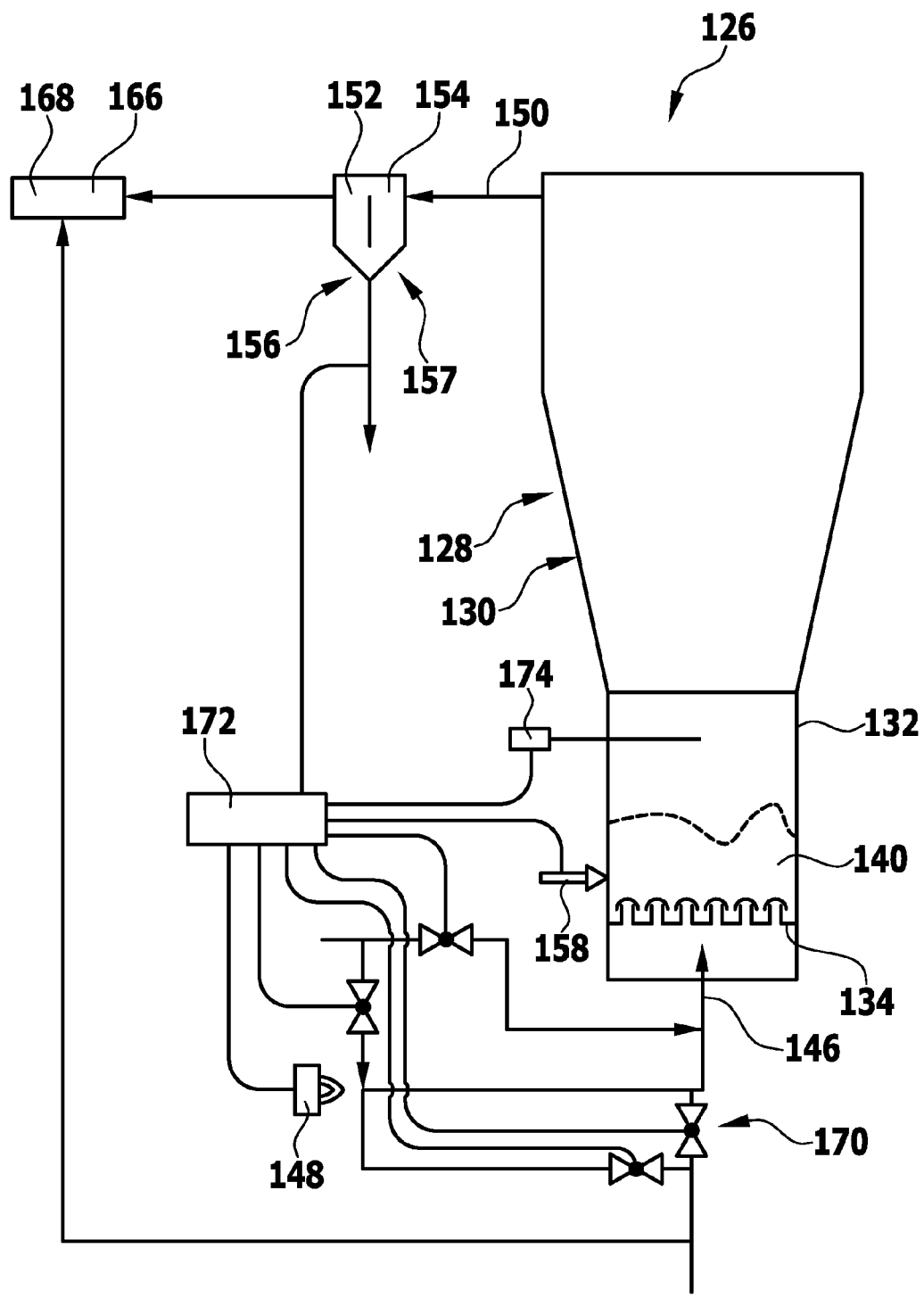
FIG. 5 shows a schematic view corresponding to FIG. 2 of a fourth embodiment of a conditioning facility, in which a plurality of part air streams are provided as a mixed incoming air stream for the conditioning device.

A fourth embodiment of a thermal conditioning facility 126 shown in FIG. 5 differs from the third embodiment shown in FIG. 4 substantially in that the conditioning facility 126 comprises a valve arrangement 170, by means of which the incoming air for the conditioning device 128 can selectively be provided from various sources, in particular from ambient air, for example workshop air, or waste air of a drying device.

Furthermore, the provided air can selectively be fed to the heating device 148 by means of the valve device 170 and heated or guided past the heating device 148.

The valve device 170 can, in particular, be controlled and/or regulated by means of a control device 172 of the conditioning facility 126 in such a way that a temperature in the receiver 132 of the conditioning device 128 is substantially constant.

A measuring device 174 is provided to check the temperature in the receiver 132 of the conditioning device 128.

The feed device 158 and the removal device 156 can preferably also be controlled and/or regulated by means of the control device 172.

Otherwise, the fourth embodiment of a conditioning facility 126 shown in FIG. 5 coincides with respect to structure and function to the third embodiment shown in FIG. 4, so to this extent reference is made to the above description thereof.

Figure 6:
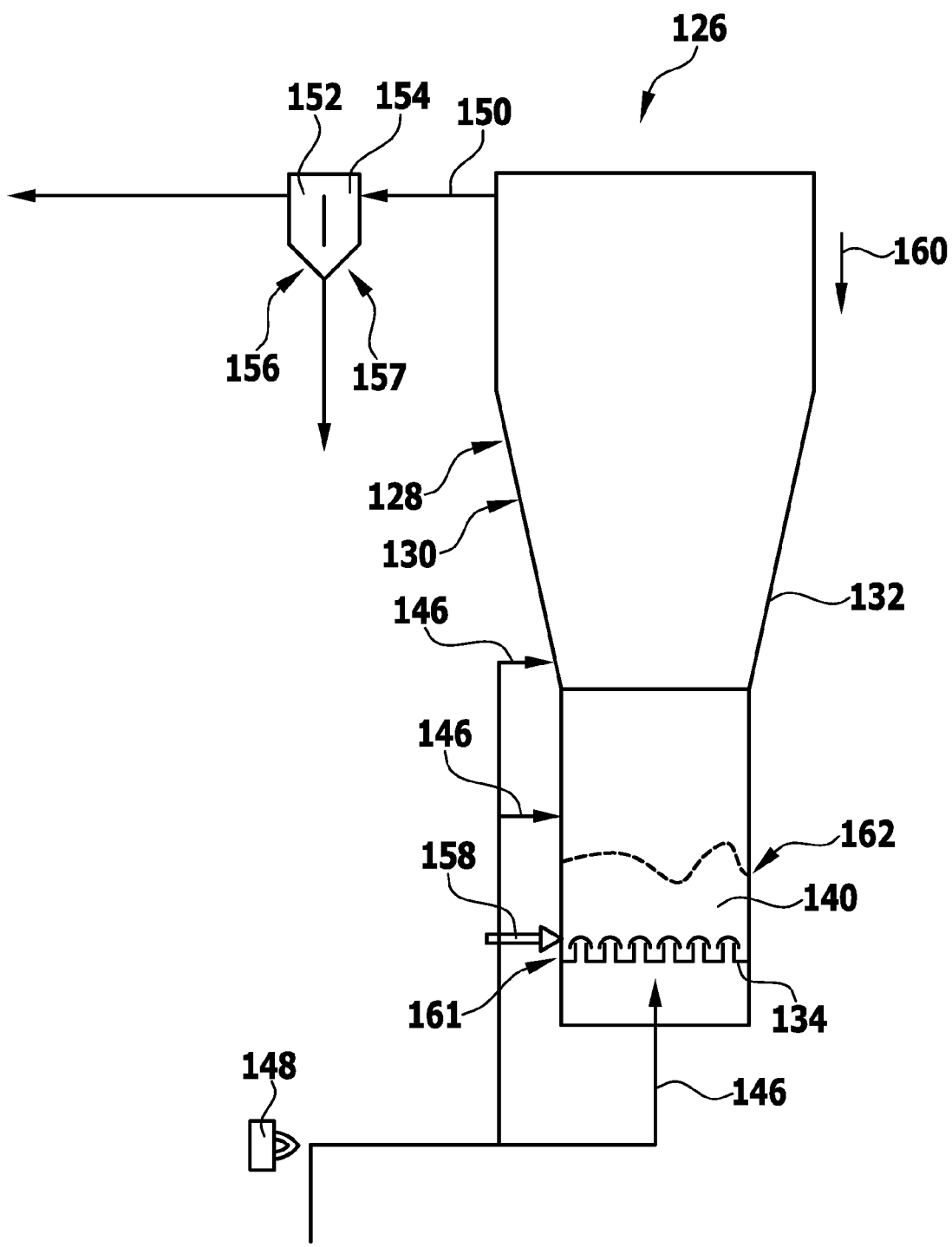
FIG. 6 shows a schematic view corresponding to FIG. 2 of a fifth embodiment of a conditioning facility, in which incoming air is fed at various points of the conditioning device.

A fifth embodiment of a thermal conditioning facility 126 shown in FIG. 6 differs from the first embodiment shown in FIG. 2 substantially in that the incoming air for the conditioning device 128 is introduced into the receiver 132 of the conditioning device 128 at various points.

On the one hand, the incoming air is introduced by way of the base 134 of the receiver 132 in order to allow a swirling of the fluidized bed base material and the auxiliary material loaded with pollutant.

Furthermore, incoming air is introduced at various points above the fluid bed 140 in order to be able to influence a swirling and/or removal of swirled conditioned auxiliary material in a targeted manner.

Otherwise, the fifth embodiment of a conditioning facility 126 shown in FIG. 6 coincides with respect to structure and function to the fourth embodiment shown in FIG. 5, so to this extent reference is made to the above description thereof.

Figure 7:
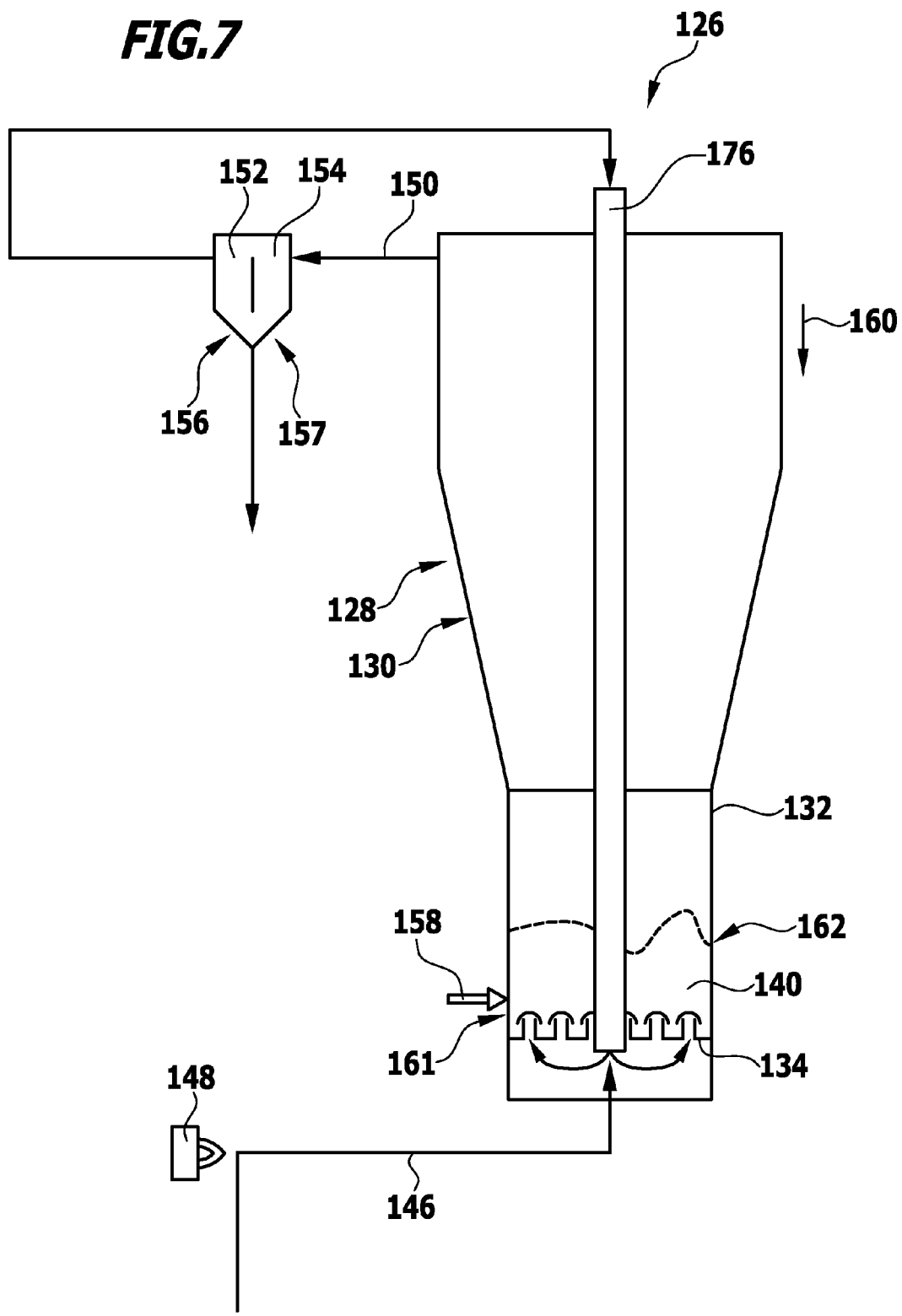
FIG. 7 shows a schematic view corresponding to FIG. 2 of a sixth embodiment of a conditioning facility, in which an air line for incoming air runs within the conditioning device.

A sixth embodiment of a thermal conditioning facility 126 shown in FIG. 7 differs from the first embodiment shown in FIG. 2 substantially in that the conditioning device 128 comprises an air line 176, which is substantially vertically oriented, is arranged centrally in the receiver 132 of the conditioning device 128 and extends substantially over the entire length of the receiver 132 of the conditioning device 128.

The air line 176 allows air to be fed to the base 134 of the receiver 132, the air being guided from above in the direction 160 of gravity through the receiver 132 of the conditioning device 128 and thus automatically being heated during operation of the conditioning device 128.

As a result, the heat present and/or produced in the conditioning device 128 can be efficiently utilized in order to minimize the necessity of additional heating.

Otherwise, the sixth embodiment of a conditioning facility 126 shown in FIG. 7 coincides with the first embodiment shown in FIG. 2, so to this extent reference is made to the above description thereof.

Figure 8:
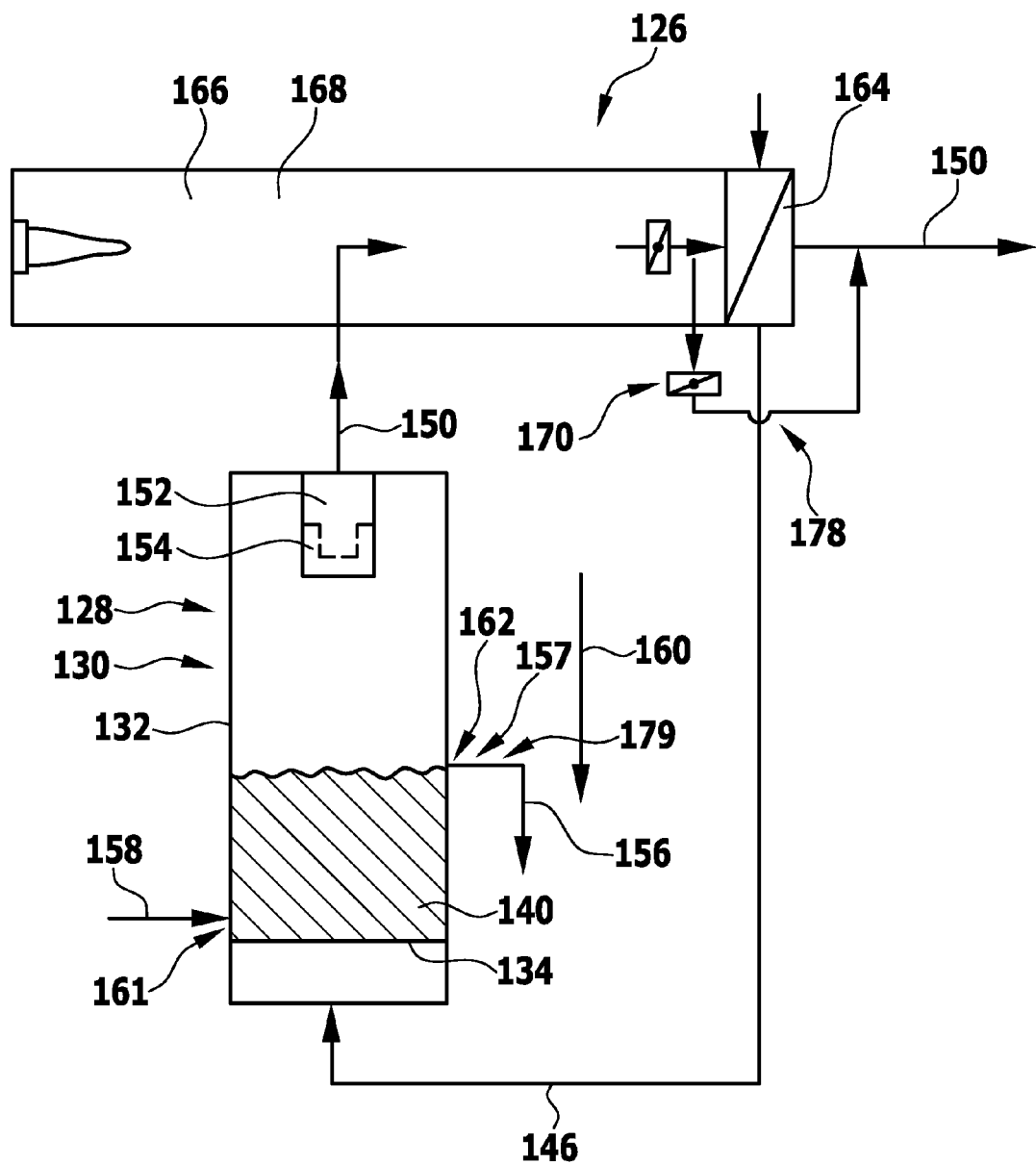
FIG. 8 shows a schematic vertical cross section through a seventh embodiment of a conditioning facility, in which a thermal post-incineration device and a heat exchanger provided with a bypass are provided to heat incoming air for the conditioning device of the conditioning facility.

A seventh embodiment of a thermal conditioning facility 126 shown in FIG. 8 differs from the first embodiment shown in FIG. 2 substantially in that the conditioning facility 126 comprises a thermal post-incineration device 168 (see also the third and fourth embodiment according to FIGS. 4 and 5).

The waste air from the conditioning device 128 is fed here to the thermal post-incineration device 168 and heated strongly therein.

Both the heated waste air from the thermal post-incineration device 168 and the incoming air for the conditioning device 128 are fed to a heat exchanger 164 in order to transfer the heat from the heated waste air to the incoming air to be heated.

In order to prevent an overheating of the incoming air and/or the receiving device 128, the heated waste air can be partly or completely guided past the heat exchanger 164 by means of a bypass 178.

To adjust a proportion of the waste air guided through the heat exchanger 164 and a proportion of the waste air guided past the heat exchanger 164 by means of the bypass 178, a valve arrangement 170 is provided in the seventh embodiment of the conditioning facility 126 shown in FIG. 8. The valve arrangement 170 is, for example, controllable by means of the control device 172 (see, in particular, the fourth embodiment according to FIG. 5).

To separate the conditioned auxiliary material from the auxiliary material loaded with pollutant, a separating device 157 configured as an overflow device 179 can be provided. By means of this overflow device 179, which is preferably arranged in the upper region 162 of the fluidized bed 140, conditioned auxiliary material accumulating in the upper region 162 can be separated from the auxiliary material loaded with pollutant accumulating in particular in the lower region 161.

Otherwise, the seventh embodiment of the conditioning facility 126 shown in FIG. 8 coincides with respect to structure and function to the first embodiment shown in FIG. 2, so to this extent reference is made to the above description thereof.

Figure 9:
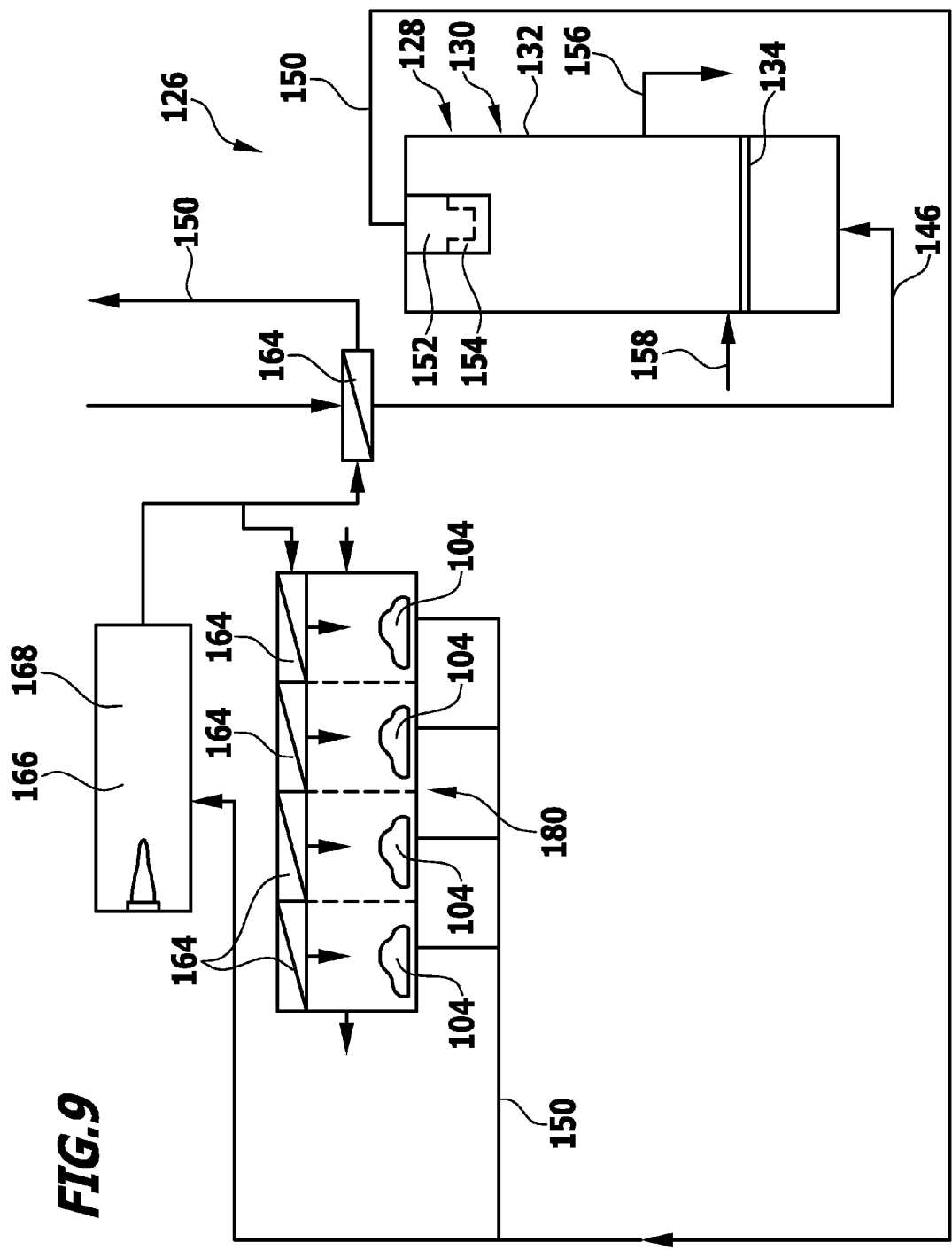
FIG. 9 shows a schematic view corresponding to FIG. 8 of an eighth embodiment of a conditioning facility, which is coupled to a drying device for drying workpieces.

An eighth embodiment of a thermal conditioning facility 126 shown in FIG. 9 differs from the seventh embodiment shown in FIG. 8 substantially in that the air guide (incoming and waste air) of the conditioning device 128 together with the heat exchanger 164 is integrated in the air guide (incoming and waste air) of a drying device 180 for drying workpieces 104, in particular vehicle bodies, and an associated thermal post-incineration device 168.

In accordance with the seventh embodiment shown in FIG. 8, the waste air for the conditioning device 128 is also heated by means of a heat exchanger 164 in the eighth embodiment shown in FIG. 9, to which heat exchanger the waste air of the conditioning device 128 heated in the thermal post-incineration device 168 is fed.

In addition, it is provided in the ninth embodiment shown in FIG. 8 that the heat from the waste air of the thermal post-incineration device 168 is transferred by means of further heat exchangers 164 to the incoming air for the drying device 180.

The waste air from the drying device 180, like the waste air from the conditioning device 128, is fed to the thermal post-incineration device 168.

Otherwise, the eighth embodiment of a conditioning facility 126 shown in FIG. 9 corresponds with respect to structure and function to the seventh embodiment shown in FIG. 8, so to this extent reference is made to the above description thereof.

Figure 10:
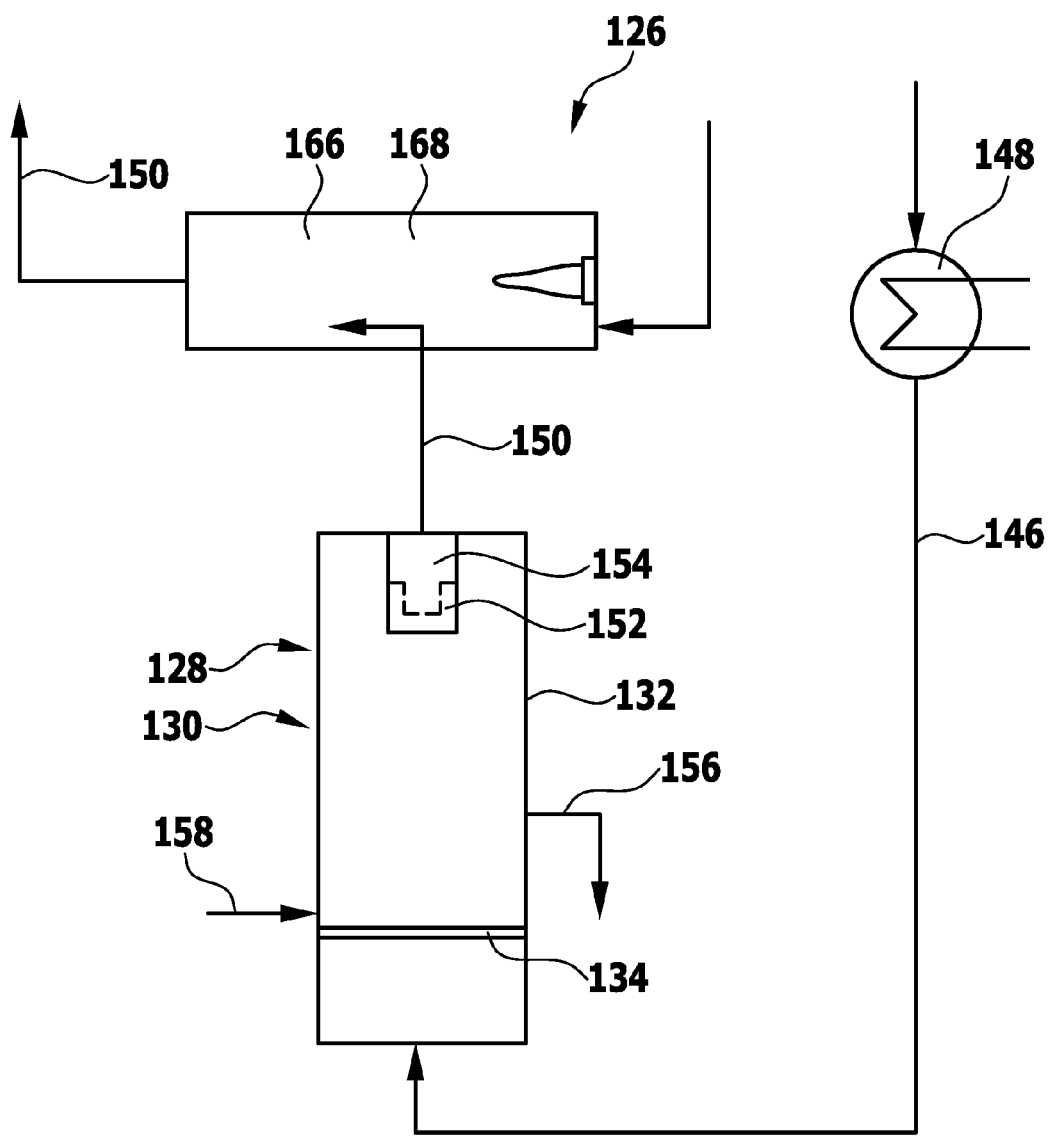
FIG. 10 shows a schematic view corresponding to FIG. 8 of a ninth embodiment of a conditioning facility, in which an electric heating device is provided for heating incoming air for the conditioning device of the conditioning facility.

A ninth embodiment of a thermal conditioning facility 126 shown in FIG. 10 differs from the first embodiment shown in FIG. 2 substantially in that the heating device 148 is configured as an electric heating device 148, in particular as an electric heating unit.

The incoming air for the conditioning device 128 is therefore heated by means of an electric heating device 148.

The waste air from the conditioning device 128 is fed to a thermal post-incineration device 168, is thus freed of undesired pollutants and finally discharged into the surroundings.

Otherwise, the ninth embodiment of a conditioning facility 126 shown in FIG. 10 coincides with respect to structure and function to the first embodiment shown in FIG. 2, so to this extent reference is made to the above description thereof.

Figure 11:
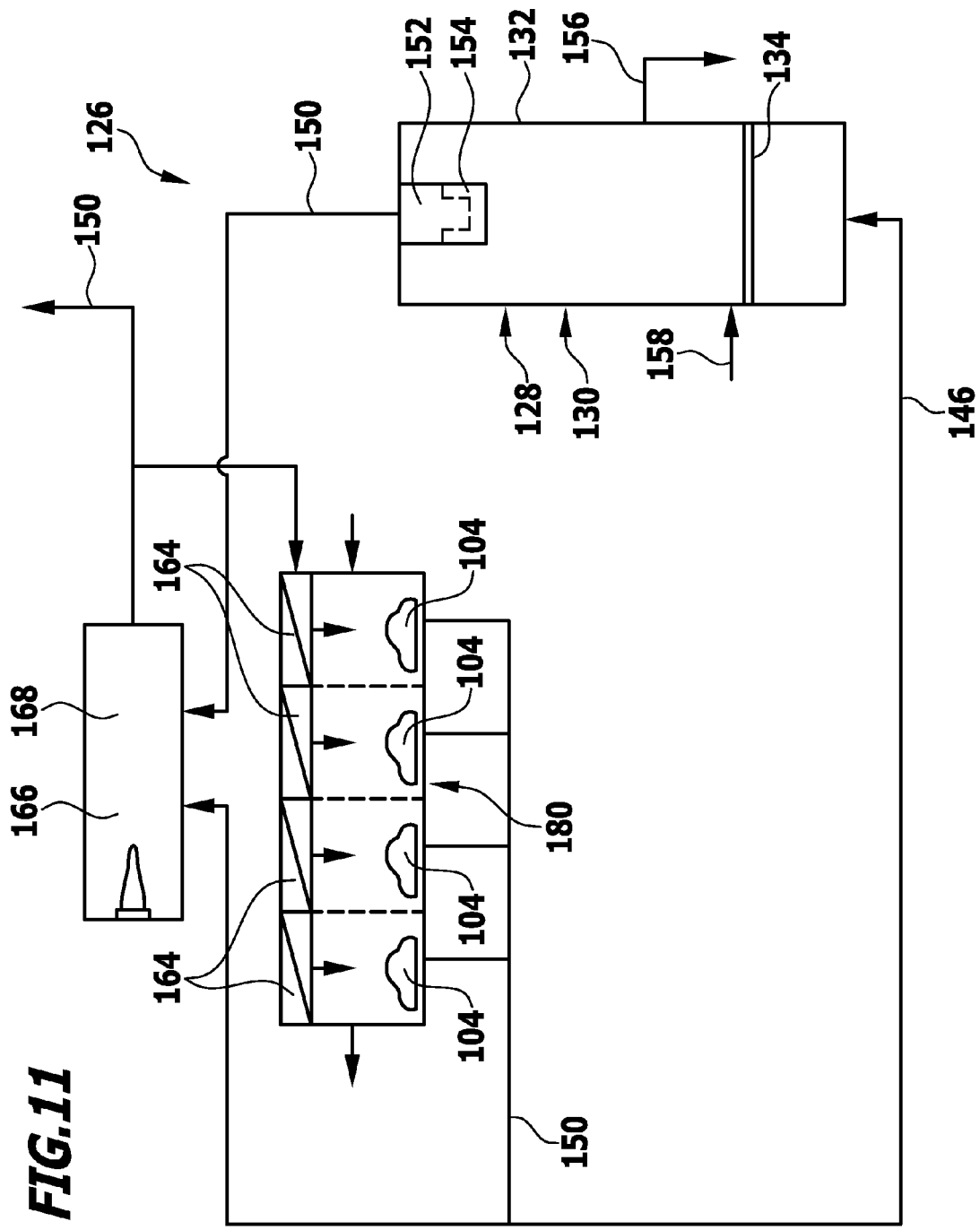
FIG. 11 shows a schematic view corresponding to FIG. 8 of a tenth embodiment of a conditioning facility, in which a circulating air circuit is provided to operate the conditioning device of the conditioning facility and a drying device for drying workpieces.

A tenth embodiment of a thermal conditioning facility 126 shown in FIG. 11 differs from the eighth embodiment shown in FIG. 9 substantially in that the incoming air for the conditioning device 128 is a part of the waste air from the drying device 180.

The remaining part of the waste air from the drying device 180 is fed to the thermal post-incineration device 168.

Likewise, the waste air from the conditioning device 128 is fed to the thermal post-incineration device 168.

Otherwise, the tenth embodiment of a conditioning facility 126 shown in FIG. 11 coincides with respect to structure and function to the eighth embodiment shown in FIG. 9, so to this extent reference is made to the above description thereof.

Figure 12:
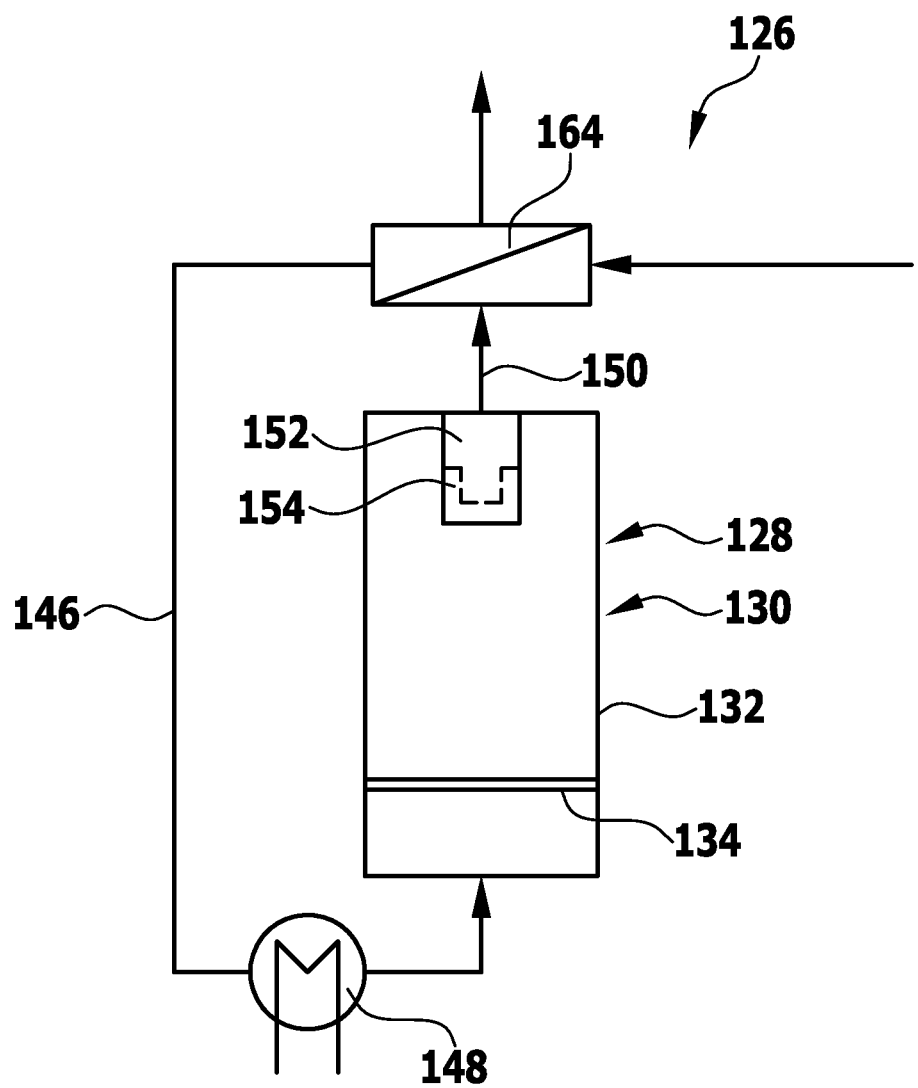
FIG. 12 shows a schematic view corresponding to FIG. 8 of an eleventh embodiment of a conditioning facility, in which an electric heating device and a heat exchanger are provided.

An eleventh embodiment of a thermal conditioning facility 126 shown in FIG. 12 differs from the second embodiment shown in FIG. 3 substantially in that the heating device 148 is configured as an electric heating device 148, in particular as an electric heating unit.

In connection therewith, the heating device 148 is, in particular, an auxiliary heating device.

Otherwise, the eleventh embodiment of a conditioning facility 126 shown in FIG. 12 coincides with respect to structure and function to the second embodiment shown in FIG. 3, so to this extent reference is made to the above description thereof.

Figure 13:
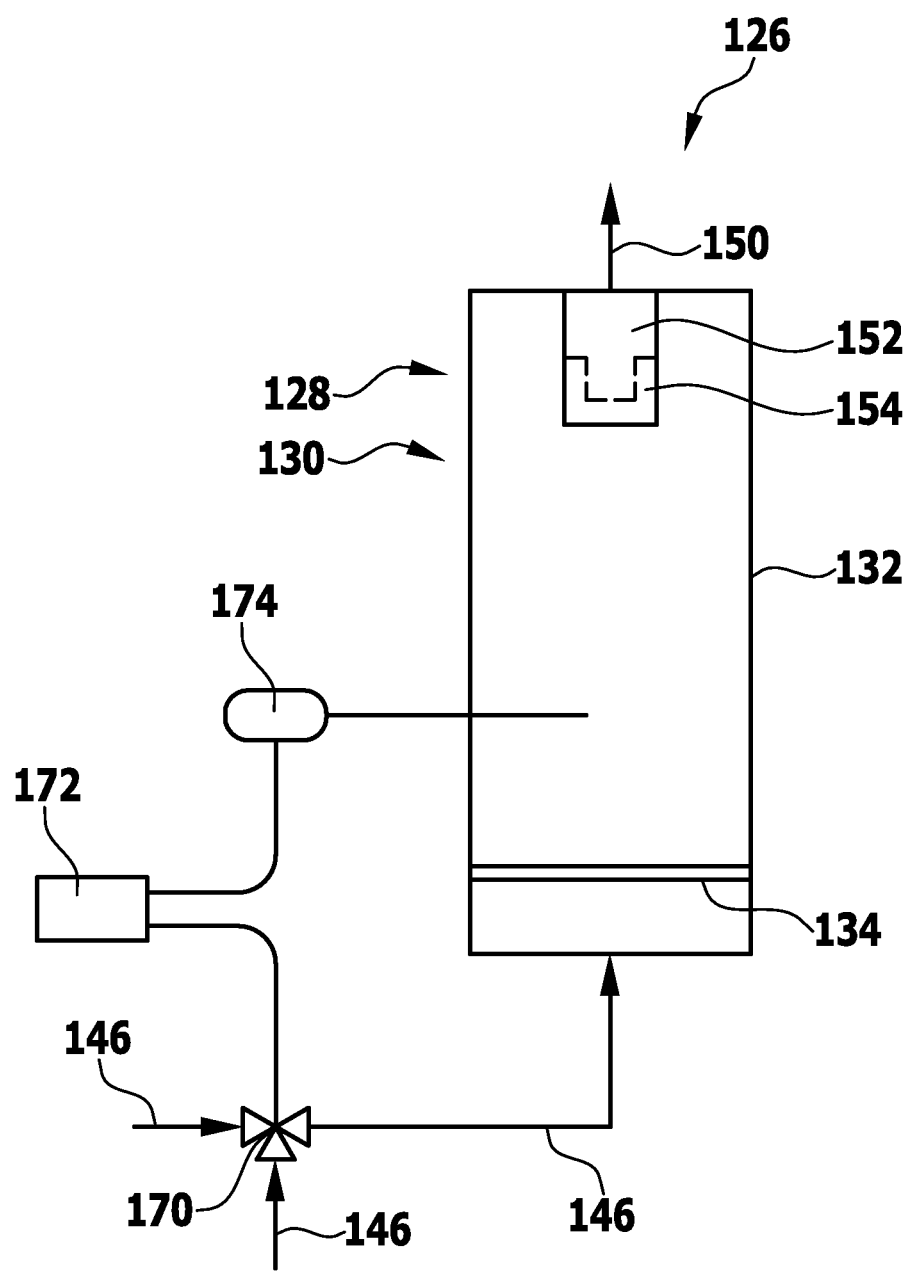
FIG. 13 shows a schematic view corresponding to FIG. 8 of a twelfth embodiment of a conditioning facility, in which a measuring device is provided to determine gas concentrations in the conditioning device of the conditioning facility.

A twelfth embodiment of a thermal conditioning facility 126 shown in FIG. 13 differs from the fourth embodiment shown in FIG. 5 substantially in that not only air streams at different temperatures but also gas streams with a different composition are also selectively configured to be fed, individually or mixed, as incoming air to the conditioning device 128 by means of the valve arrangement 170.

A gas concentration, in particular an oxygen concentration is preferably determinable here in the conditioning device 128 by means of the measuring device 174.

Depending on the gas concentration determined by means of the measuring device 174, the control device 172 can influence the valve arrangement 170 in order to optimize the process parameters in the conditioning device 128.

Otherwise, the twelfth embodiment of a conditioning facility 126 shown in FIG. 13 coincides with respect to structure and function to the fourth embodiment shown in FIG. 5, so to this extent reference is made to the above description thereof.

Figure 14:
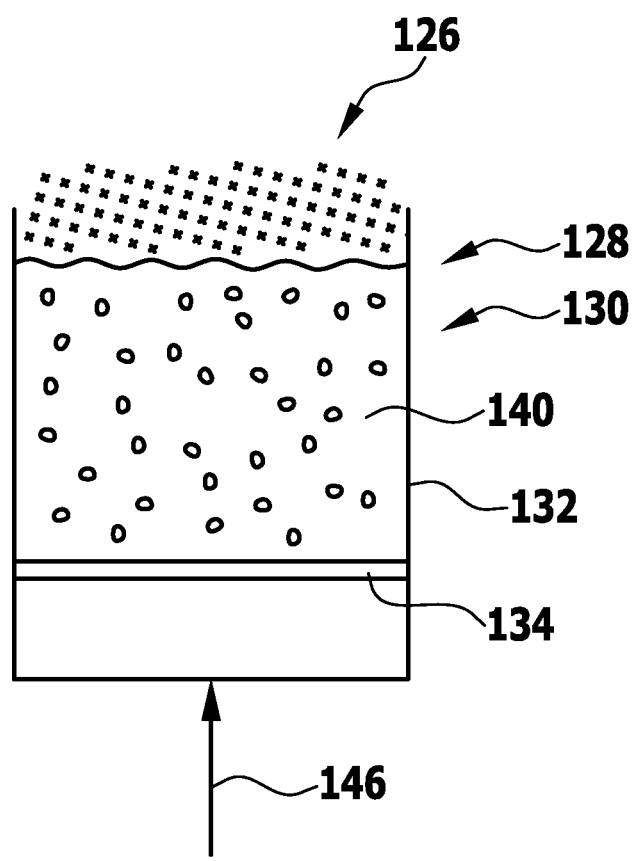
FIG. 14 shows a schematic view of a conditioning device of a conditioning facility; in which a bubble-forming fluidized bed is formed.

FIG. 14 schematically shows an operating type of a conditioning device 128, in which a bubble-forming fluidized bed is produced in the receiver 132 of the conditioning device 128.

In a bubble-forming fluidized bed of this type, air flows through the fluidized bed base material and/or the auxiliary material loaded with pollutant. Individual solid substance particles, in particular particles of auxiliary material and/or abraded material of fluidized bed base material, are removed here from the fluidized bed.

Figure 15:
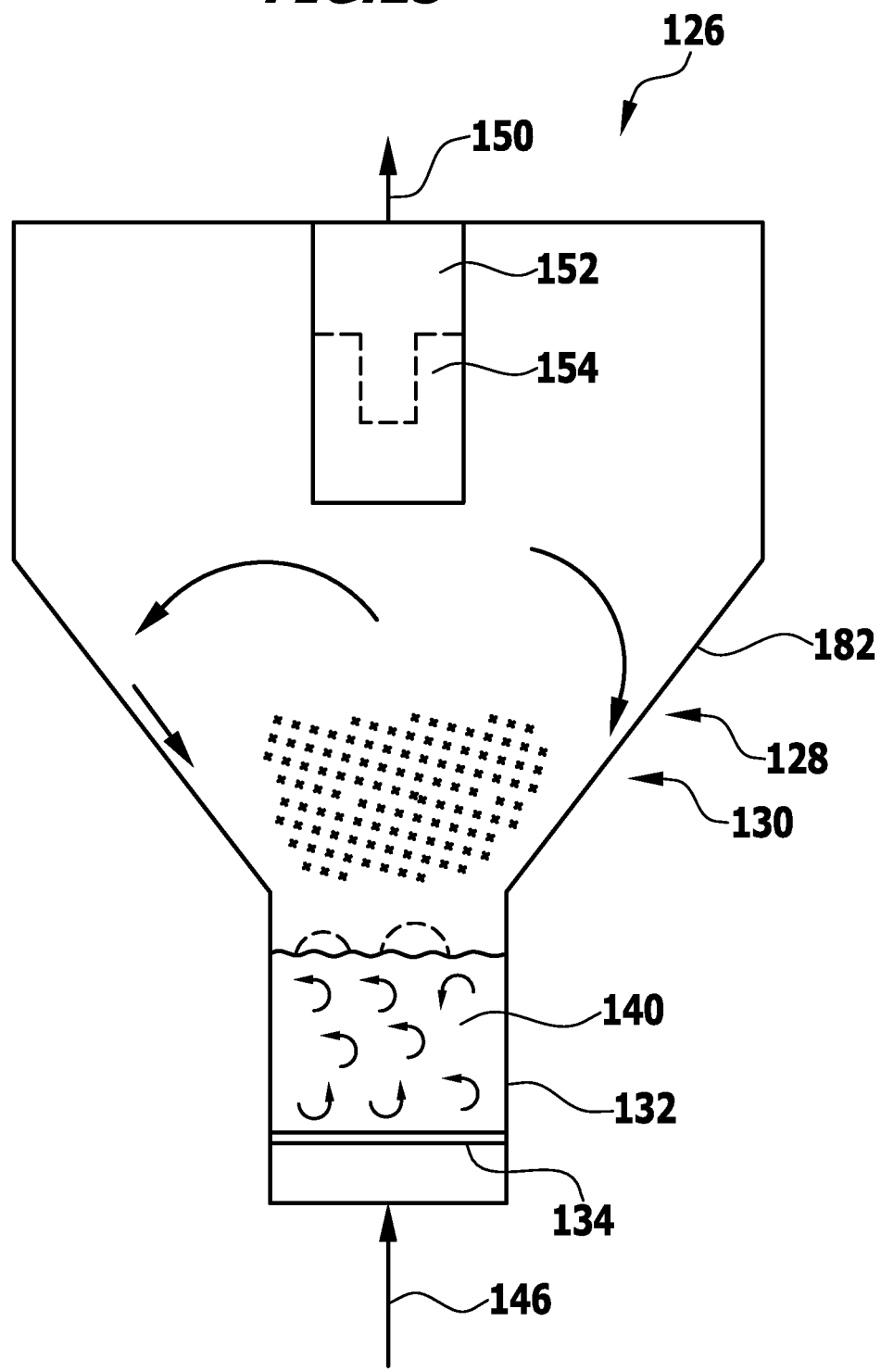
FIG. 15 shows a schematic view of a conditioning device of a conditioning facility; in which a circulating fluidized bed is formed.

FIG. 15 schematically shows an operating type of a conditioning device 128, in which a circulating fluidized bed is produced in the receiver 132 of the conditioning device 128.

In a circulating fluidized bed of this type, a strong swirling of the fluidized bed base material and/or of the auxiliary material loaded with pollutant takes place. Furthermore, massive particle removal from the fluidized bed takes place as a result, i.e. a large number of particles of auxiliary material and/or abraded material of fluidized bed base material is removed upwardly from the fluidized bed counter to the direction of gravity.

To optimize a mode of operation of this type of the conditioning device 128, the receiver 132 has a portion 182 which widens upwardly counter to the direction 160 of gravity and leads to a deceleration of the gas flow in the receiver 132 of the conditioning device 128 and allows the removed particles to trickle back into the fluidized bed 140.

An upwardly widening portion 182 of this type is also called a "freeboard".

A thirteenth embodiment of a thermal conditioning facility 126 shown in FIG. 16 differs from the first embodiment shown in FIG. 2 substantially in that a collecting container 184 is arranged below the separation device 152, by means of which collecting container conditioned auxiliary material falling down from the separation device 152 can be received.

As both the separation device 152 and the collecting container 184 are arranged laterally offset with respect to the receiver 132 of the conditioning device 128, the separated conditioned auxiliary material is prevented from arriving back in the fluidized bed 140.

By means of the separation device 152 and the collecting container 184, in the thirteenth embodiment of the conditioning facility 126 shown in FIG. 16, the conditioned auxiliary material can therefore easily be separated and finally removed from the conditioning device 128 by means of the removal device 156.

Figure 17:
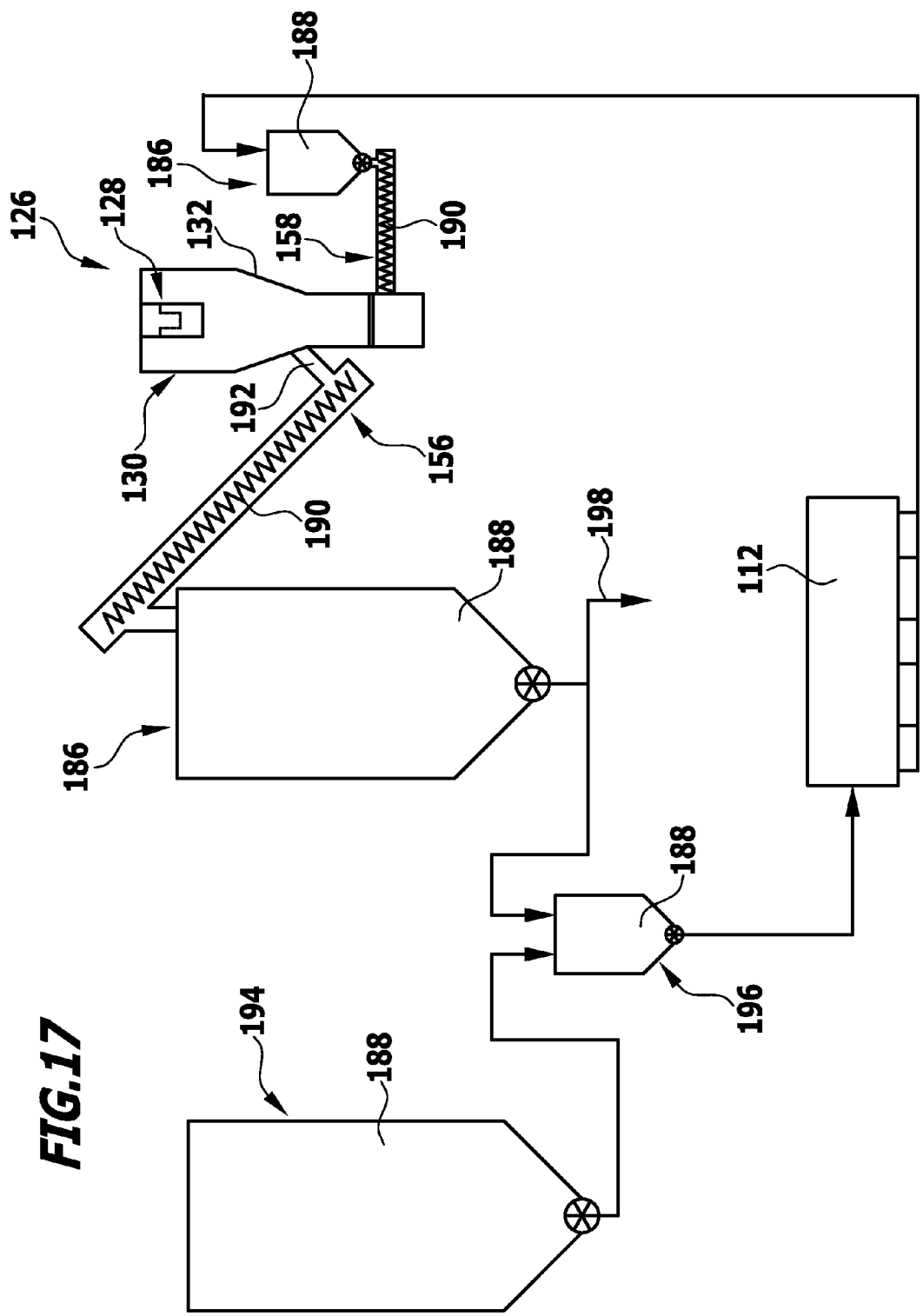
FIG. 17 shows a schematic view of a fourteenth embodiment of a conditioning facility, which comprises buffer devices for intermediately storing auxiliary material loaded with pollutant and conditioned auxiliary material.

A fourteenth embodiment of a thermal conditioning facility 126 shown in FIG. 17 differs from the first embodiment shown in FIG. 2 substantially in that the conditioning facility 126 comprises buffer devices 186, by means of which auxiliary material that is loaded with pollutant and/or conditioned can be intermediately stored.

For this purpose, buffer containers 188 of the buffer devices 186 are provided.

A first buffer container 188 is used to receive auxiliary material loaded with pollutant from the filter facility 112.

By means of a conveying device 190, for example a screw conveyor, in particular a cooling screw conveyor or a screw heat exchanger, the auxiliary material loaded with pollutant can be fed from the buffer container 188 for auxiliary material loaded with pollutant to the conditioning device 128.

The conveying device 190 is therefore a component of the feed device 158.

By means of the conveying device 190, the auxiliary material loaded with pollutant, in particular in the lower region 161 of the fluidized bed 140, can be fed to the fluidized bed base material and therefore the fluidized bed 140 itself.

By means of a further conveying device 190, which is, for example, also configured as a screw conveyor, conditioned auxiliary material, which has been removed by means of an overflow 192 from the receiver 132 of the conditioning device 128, can be fed to a further buffer container 188 of a further buffer device 186.

The overflow 192 and the further conveying device 190 are therefore a component of the removal device 156.

The conditioning facility 126 furthermore comprises a storage device 194 for storing fresh auxiliary material, a mixing device 196 for mixing conditioned auxiliary material and fresh auxiliary material and/or a disposal device 198 for disposing of too heavily contaminated auxiliary material, in particular auxiliary material too heavily contaminated with pollutant.

The storage device 194 comprises a further buffer container 188, in which fresh auxiliary material delivered, for example, by means of lorries, can be intermediately stored.

The mixing device 196 also comprises a buffer container 188, in which a mixture of fresh auxiliary material and conditioned auxiliary material can be intermediately stored.

The fourteenth embodiment of the conditioning facility 126 shown in FIG. 17 functions as follows:

A crude gas stream loaded with pollutant is cleaned in the filter facility 112 with the aid of auxiliary material.

The auxiliary material loaded thereby with pollutant has to be exchanged or conditioned after a certain period of use.

A conditioning of this type can take place by means of the thermal conditioning facility 126.

The auxiliary material loaded with pollutant is fed for this purpose from the filter facility 112 to a buffer device 186, in particular intermediately stored in a buffer container 188 for auxiliary material loaded with pollutant.

From there, the auxiliary material loaded with pollutant is conveyed by means of the conveying device 190 into the receiver 132 of the conditioning device 128.

By continuously feeding auxiliary material loaded with pollutant to the conditioning device 128, the level, i.e. the filling level, in particular the level of the fluidized bed 140, continuously increases. By means of the overflow 192, the conditioned auxiliary material accumulating in the upper region 162 of the fluidized bed 140 is removed from the receiver 132 of the conditioning device 128 and fed by means of the further conveying device 190, in particular a screw heat exchanger, to the buffer container 188 for conditioned auxiliary material. The auxiliary material is cooled here to a temperature of at most of about 40° C., so that it can be further stored at ambient temperature and optionally processed. As an alternative to using a screw heat exchanger, a bulk material heat exchanger, in which a cooling takes place by means of percolating past heat exchanger tubes, or a pneumatic conveyance with or without an integrated heat exchanger can be provided in a conveying line.

From the buffer container 188 for conditioned auxiliary material and the buffer container 188 for fresh auxiliary material, the respective auxiliary material is fed to the mixing device 196, in particular the buffer container 188 of the mixing device 196. The mixture in this case comprises, for example, about 70% of conditioned auxiliary material and about 30% of fresh auxiliary material.

The auxiliary material mixed by means of the mixing device 196 is finally fed for reuse to the filter facility 112.

The required gas streams, in particular air streams, in the thermal conditioning facility 126 are preferably driven by means of at least one fan, which, in particular, overcomes all the pressure losses in the conditioning facility 126. The pressure losses may, for example, be between about 200 mbar and about 300 mbar here.

Otherwise, the fourteenth embodiment of the conditioning facility 126 shown in FIG. 17 coincides with respect to structure and function to the first embodiment shown in FIG. 2, so to this extent reference is made to the above description thereof.

It may be provided in further embodiments, not shown, of thermal conditioning facilities 126 that individual or a plurality of features of the described embodiments are combined with one another in any desired manner.

Thus, for example, it may be provided that the fourteenth embodiment of the thermal conditioning facility 126 shown in FIG. 17 is provided according to the third embodiment shown in FIG. 4 with a thermal post-incineration device 168.

As in all the embodiments of thermal conditioning facilities 126, auxiliary material loaded with pollutant is thermally conditioned and the conditioned auxiliary material is separated by means of a gas flow from the auxiliary material still loaded with pollutant, the conditioning of auxiliary material takes place in a particularly simple and resource-saving manner.

The invention claimed is:

1. A method for the thermal conditioning of an auxiliary material configured to clean a crude gas stream loaded with an organic pollutant by being introduced into the crude gas stream and removing at least a portion of the organic pollutant such that a loaded auxiliary material is produced, comprising:
   feeding the loaded auxiliary material into a receiver of a thermal conditioning device;
   feeding a heated gas stream into the thermal conditioning device such that the loaded auxiliary material is heated;
   chemically converting at least a part of the organic pollutant loaded in the loaded auxiliary material by heating the loaded auxiliary material with the heated gas stream to produce a conditioned auxiliary material;
   separating the conditioned auxiliary material from the loaded auxiliary material; and
   removing the conditioned auxiliary material from the thermal conditioning device.

2. The method according to claim 1, wherein the organic pollutant is in the form of paint overspray, and wherein the loaded auxiliary material is loaded with the paint overspray and is configured to be deposited on a filter.

3. The method according claim 1, wherein the thermal conditioning device comprises a fluidized bed base material, which has a chemical composition that corresponds to the chemical composition of the auxiliary material.

4. The method according to claim 3, wherein the median of the particle size distribution of the fluidized bed base material is greater than at least one of the median of the particle size distribution of a fresh auxiliary material, the median of the particle size distribution of the conditioned auxiliary material, or the median of the particle size distribution of the and loaded auxiliary material.

5. The method according to claim 1, wherein the step of chemically converting at least a part of the organic pollutant loaded in the loaded auxiliary material, comprises combusting the organic pollutant such that agglomerates of pollutant and auxiliary material are reduced into small pieces and the conditioned auxiliary material is produced.

6. The method according to claim 1, wherein the step of chemically converting at least a part of the organic pollutant loaded in the loaded auxiliary material does not chemically change particles of the auxiliary material.

7. The method according to claim 1, wherein the thermal conditioning device is operated in such a way that a gradient is formed in the particle size distribution of the auxiliary material, the median of the particle size distribution increasing downwardly in the direction of gravity.

8. The method according to claim 1, further comprising producing a fluidized bed in the thermal conditioning device by swirling a fluidized bed base material with the heated gas stream, and wherein the loaded auxiliary material is fed into the thermal conditioning device at a lower region of the fluidized bed with respect to the direction of gravity.

9. The method according to claim 1, further comprising producing a fluidized bed in the thermal conditioning device by swirling a fluidized bed base material with the heated gas stream, and wherein at least one of particles of the loaded auxiliary material, particles of the conditioned auxiliary material, or particles of the fluidized bed base material, which collect in an upper region of the fluidized bed with respect to the direction of gravity, are removed from the thermal conditioning device.

10. The method according to claim 1, wherein the heated gas stream is guided from bottom to top of the thermal conditioning device in a direction opposite to the direction of gravity such that the heated gas stream is guided through the loaded auxiliary material to swirl the loaded auxiliary material, wherein at least one of before or after flowing through the loaded auxiliary material, the heated gas stream is fed to at least one of a separation device or a combustion device.

11. The method according to claim 1, further comprising producing a fluidized bed in the thermal conditioning device by swirling a fluidized bed base material with the heated gas stream, and removing particles of the loaded auxiliary material and/or particles of the conditioned auxiliary material from the fluidized bed by guiding the heated gas stream through the fluidized bed such that particles of the loaded auxiliary material and/or particles of the conditioned auxiliary material are entrained by the heated gas stream and are deposited on a separation device for removal from the conditioning device.

12. The method according to claim 1, wherein the heated gas stream is guided from bottom to top of the thermal conditioning device in a direction opposite to the direction of gravity such that the heated gas stream is guided through the loaded auxiliary material to swirl the loaded auxiliary material, wherein at least one of before or after flowing through the loaded auxiliary material, the heated gas stream is fed to at least one of a heat exchanger or a drying device to dry workpieces.

13. A conditioning facility for the thermal conditioning of an auxiliary material configured to clean a crude gas stream loaded with an organic pollutant by removing at least a portion of the organic pollutant from the crude gas stream such that a loaded auxiliary material and a clean gas stream are produced, the conditioning facility comprising:
- a thermal conditioning device configured for the chemical conversion of at least a part of the organic pollutant loaded in the loaded auxiliary material to produce a conditioned auxiliary material;
- a feed device for feeding the loaded auxiliary material and a heated gas stream to the thermal conditioning device;
- a separator for separating the conditioned auxiliary material from the loaded auxiliary material; and
- a removal device for removing the conditioned auxiliary material from the thermal conditioning device.

14. The conditioning facility according to claim 13, wherein the thermal conditioning device is configured as a fluidized bed furnace.

15. The conditioning facility according to claim 13, wherein the thermal conditioning device comprises a fluidized bed produced by swirling a fluidized bed base material with the heated gas stream, and wherein the removal device is configured to remove particles of the conditioned auxiliary material located in an upper region of the fluidized bed with respect to the direction of gravity from the thermal conditioning device.

16. The conditioning facility according to claim 13, wherein the conditioning facility comprises at least one of a separator or a combustion device, to which the heated gas stream is feedable after flowing through the thermal conditioning device.

17. A painting facility for painting workpieces, in particular vehicle bodies, comprising:
- a painting device configured to paint the workpieces;
- a conditioning facility according to claim 13, wherein the organic pollutant is paint overspray and the auxiliary material is auxiliary filter material; and
- a filter device for cleaning the crude gas stream produced in the painting device and loaded with the paint overspray, wherein the filter device is configured to clean the crude gas stream by feeding the auxiliary filter material to the crude gas stream and depositing the paint overspray together with the auxiliary filter material on a filter element of the filter device.

* * * * *